US010212761B2

(12) United States Patent
Le et al.

(10) Patent No.: US 10,212,761 B2
(45) Date of Patent: *Feb. 19, 2019

(54) SYSTEMS FOR IMPROVED MULTI-CHANNEL NETWORK CONNECTIVITY PERFORMANCE AND SECURITY

(71) Applicant: Shoelace Wireless, Inc., Irvine, CA (US)

(72) Inventors: Minh Thoai Anh Le, Irvine, CA (US); James A. Mains, Irvine, CA (US)

(73) Assignee: SHOELACE WIRELESS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,382

(22) Filed: Jul. 12, 2017

(65) Prior Publication Data
US 2017/0325286 A1    Nov. 9, 2017

Related U.S. Application Data

(63) Continuation of application No. 15/134,201, filed on Apr. 20, 2016, now Pat. No. 9,749,293.
(Continued)

(51) Int. Cl.
*H04L 29/00* (2006.01)
*H04W 92/02* (2009.01)
(Continued)

(52) U.S. Cl.
CPC .............. *H04W 92/02* (2013.01); *H04L 12/46* (2013.01); *H04L 12/4641* (2013.01);
(Continued)

(58) Field of Classification Search
CPC ..... H04L 63/20; H04L 12/4641; H04L 45/22; H04L 61/2007; H04L 61/6063;
(Continued)

(56) References Cited

U.S. PATENT DOCUMENTS 6,061,796 A * 5/2000 Chen .................. H04L 12/4641
380/283
6,775,548 B1 8/2004 Rong et al.
(Continued)

OTHER PUBLICATIONS

UCI, "AMASE Competition ('A Mobile Application Showcase Event')," UC Irvine School of ICS, 2012, http://www.ics.uci.edu/community/events/amase/index.php, 1-2 (2 pages).
(Continued)

*Primary Examiner* — Don G Zhao
(74) *Attorney, Agent, or Firm* — Acuity Law Group, P.C.; Daniel M. Chambers

(57) ABSTRACT

Systems and methods that efficiently combine multiple wireless networks or devices resulting in faster, more reliable, and more secure mobile Internet. A Virtual Private Network (VPN) service application is operated to route outgoing and incoming data packets of a mobile device. The mobile device is (i) either coupled to a remote server through the VPN service application for data packets transfer between the remote server and the mobile device or (ii) performs cross-layer translation for data packets transfer between the mobile device and direct target hosts on the Internet. Concurrently using multiple channels secures data packets transfer by sending encrypted data packets over multiple channels and receiving the encrypted data packets by a single apparatus. Data packets are designated to be transferred via a Wi-Fi channel or a cellular channel, and then transferred using both the Wi-Fi channel and the cellular channel.

17 Claims, 19 Drawing Sheets

Related U.S. Application Data

(60) Provisional application No. 62/196,583, filed on Jul. 24, 2015, provisional application No. 62/150,250, filed on Apr. 20, 2015.

(51) Int. Cl.

| | | |
|---|---|---|
| *H04L 12/46* | (2006.01) | |
| *H04L 12/707* | (2013.01) | |
| *H04L 29/08* | (2006.01) | |
| *H04L 29/06* | (2006.01) | |
| *H04W 12/02* | (2009.01) | |
| *H04L 29/12* | (2006.01) | |
| *H04W 76/12* | (2018.01) | |
| *H04L 12/64* | (2006.01) | |
| *H04W 72/04* | (2009.01) | |

(52) U.S. Cl.
CPC .............. *H04L 12/64* (2013.01); *H04L 45/22* (2013.01); *H04L 61/1511* (2013.01); *H04L 63/0236* (2013.01); *H04L 63/0272* (2013.01); *H04L 63/0281* (2013.01); *H04L 63/123* (2013.01); *H04L 67/02* (2013.01); *H04W 12/02* (2013.01); *H04W 76/12* (2018.02); *H04L 63/08* (2013.01); *H04L 63/10* (2013.01); *H04L 67/10* (2013.01); *H04W 72/044* (2013.01)

(58) Field of Classification Search
CPC ............. H04L 63/0236; H04L 63/0272; H04L 63/0281; H04L 63/0428; H04L 67/02; H04L 67/42; H04W 72/044; H04W 12/02; H04W 76/12; H04W 92/02
See application file for complete search history.

(56) References Cited

U.S. PATENT DOCUMENTS

| | | | |
|---|---|---|---|
| 8,060,875 B1 | 11/2011 | Lambeth | |
| 8,286,250 B1 | 10/2012 | Le et al. | |
| 8,365,291 B1 | 1/2013 | Le et al. | |
| 8,644,816 B2 | 2/2014 | Schmidtke et al. | |
| 8,817,797 B2 | 8/2014 | Hampel et al. | |
| 2002/0010792 A1* | 1/2002 | Border | H04B 7/18582 709/238 |
| 2003/0149787 A1* | 8/2003 | Mangan | H04L 12/4641 709/238 |
| 2003/0182431 A1* | 9/2003 | Sturniolo | H04L 63/0272 709/227 |
| 2004/0068668 A1 | 4/2004 | Lor et al. | |
| 2005/0208947 A1* | 9/2005 | Bahl | H04L 12/4633 455/450 |
| 2009/0034546 A1* | 2/2009 | Nagata | H04L 12/4641 370/401 |
| 2009/0122990 A1 | 5/2009 | Gundavelli et al. | |
| 2011/0265088 A1* | 10/2011 | Devadhar | G06F 9/505 718/102 |
| 2011/0296486 A1* | 12/2011 | Burch | H04L 63/0807 726/1 |
| 2012/0005476 A1* | 1/2012 | Wei | H04L 63/0272 713/153 |
| 2012/0005746 A1* | 1/2012 | Wei | H04L 63/0272 726/15 |
| 2012/0188949 A1 | 7/2012 | Salkintzis et al. | |
| 2012/0331360 A1 | 12/2012 | Whetsel | |
| 2013/0111038 A1 | 5/2013 | Girard | |
| 2013/0201909 A1* | 8/2013 | Bosch | H04W 40/36 370/328 |
| 2013/0322255 A1 | 12/2013 | Dillon | |
| 2013/0332621 A1 | 12/2013 | Keller et al. | |
| 2014/0024447 A1 | 1/2014 | Le et al. | |
| 2014/0237585 A1 | 8/2014 | Khan et al. | |
| 2014/0254595 A1 | 9/2014 | Luo et al. | |
| 2014/0258819 A1 | 9/2014 | Chen et al. | |
| 2015/0043345 A1 | 2/2015 | Testicioglu et al. | |
| 2015/0288765 A1* | 10/2015 | Skraparlis | H04L 12/4641 709/228 |
| 2016/0014230 A1* | 1/2016 | Wallin | H04L 41/5051 370/401 |
| 2017/0325113 A1 | 11/2017 | Markopoulou et al. | |

OTHER PUBLICATIONS uci.edu, "MicroCast: Proximal Video Sharing on Mobile Devices," Cooperative Networking on Mobile Devices—Networking Group (http://odysseas.calit2.uci.edu/wiki/doku.php?id=public:muri09), 1-3 (3 pages).

Van Beijnam, "Multipath TCP lets Siri seamlessly switch between Wi-Fi and 3G/LTE," arsTechnica (http://artechnica.com/apple/2013/09/multipath-tcp-lets-siri-seamlessly-switch-between-wi-fi-and-3glte), 2013, 1-4 (4 pages).

Whitbeck et al., "Relieving the Wireless Infrastructure: When Opportunistic Networks Meet Guaranteed Delays," Proceedings of the 2011 IEEE International Symposium on a World of Wireless, Mobileand Multimedia Networks (WoWMoM), 2011, 1-10 (9 pages).

Youtube Help, "Recommended upload encoding settings," (https://support.google.com/youtube /answer/1722171?hl=en), 2016, 1-3 (3 pages).

Abbas et al., "An optimized approach to video traffic splitting in heterogeneous wireless networks with energy and QoE considerations," Journal of Network and Computer Applications, 2017, 72-88, 83(2017) (17 pages).

Akamai, "The State of the Internet 4th quarter 2012 Executive Summary", 2013, 1-2, 5(4) (4 pages).

Ananthanarayanan et al., "COMBINE: Leveraging the Power of Wireless Peers Through Collaborative Downloading," Proceedings of the 5th International Conference on Mobile Systems, Applications and Services (MobiSys), 2007, 286-298 (13 pages).

Android Pipe, "Video Streaming at Its Best with VideoBee for Android," Android Pipe.com (http://www.androidpipe.com/video-streaming-at-its-best-with-videobee-for-android/), 2014, 1-4 (4 pages).

Android, "Android 2.2 Platform Highlights," http://developer.android.com/about/versions/android-2.2-highlights.html), 2016, 1-5 (5 pages).

Android, "VpnService," (http://developer.android.com/reference/android/net/VpnService.html), 2016, 1-8 (8 pages).

Android, "Supported Media Format," (http://developer.android.com/guide/appendix/media-formats.html), 2016, 1-4 (4 pages).

Apple, "Using HTTP Live Streaming," (https://developer.apple.com/library/mac/documentation/NetworkingInternet/Conceptual/StreamingMediaGuide/UsingHTTPLiveStreamimg/UsingHTTPLiveStreaming.html), 2016, 1-10 (10 pages).

AT&T News Release, "AT&T to Invest $14 Billion to Significantly Expand Wireless and Wireline Broadband Networks, Support Future IP Data Growth and New Services," http://www.att.com/gen/press-room?pid23506&cdvn=news&newsarticleid=35561&mapcode=, 2012, 1-3 (3 pages).

AT&T, "What you get with Mobile Share Value," (http://localization.att.com/loc/controller?type=res&cdvn=landinglocalization&pid=1080&return-path=https://www.att.com/shop/wireless-plans.html/#bid=1OndEspv76W), 1-3 (3 pages).

Boldrini et al., "Exploiting users' social relations to forward data in opportunistic networks: The HiBOp solution," Pervasive and Mobile Computing, 2008, 633-657, 4(5) (25 pages).

Bradley et al., "Breaking Down the Verizon Share Everything Plan Math," PC World, 2012, 1-2 (2 pages).

Business Insider, "Net neutrality is weeks away from dying, and the first signs of change are already showing up at Netflix and other internet companies," (http://www.businessinsider.com/netfix-and-others-warn-about-the-end-of-the-net-neutrality-rules-2018-5), 2018, 1-6 (6 pages).

Cartmell, "Research paper LTE Converged Gateway IP Flow Mobility Solution," Interdigital (https://www.interdigital.com/research_papers/2012_01_26_lte_converged_gateway_ip_flow_mobility_solution), 2012, 1-7 (7 pages).

(56) References Cited

OTHER PUBLICATIONS

Chesterfield et al., "Exploiting Diversity to Enhance Multimedia Streaming Over Cellular Links," Proceedings of the 2005 IEEE INFOCOM, 2005, 2020-2031 (12 pages).
Cisco, "Cisco Visual Networking Index: Forecast and Methodology, 2012-2017," https://www.cisco.com/c/en/us/solutions/collateral/service-provider/visual-networking-index-vni/complete-white-paper-c11-481360.html, 2013, 1-11 (15 pages).
Conviva, "Viewer Experience Report, 2012," 2013, 1-18 (18 pages).
CTIA, "CTIA Announces Startup Throw Down Winners at CTIA 2013," CTIA—The Wireless Association (http://www.ctia.org/resource-library/press- releases/archive/ctla-startup-throw-down-winner-ctia-2013), 2013, 1-2 (2 pages).
Dano, "Despite 5G, wireless carriers' service revenue predicted to peak in 2021," FierceWireless (https://www.fiercewireless.com/5g/despite-5g-wireless-carriers-service-revenue-predicted-to-peak-2021), 2017, 1-4 (4 pages).
Danova, "Here's What People Are Actually Watching on Their Smartphones and Tablets, As TV Goes Mobile," Business Insider (http://www.businessinsider.com/mobile-video-report-2013-12), 2013, 1-3 (3 pages).
Egzthunder1, "Get Your Videos Faster with VideoBee for Android," XDA Developers (http://www.xda-developers.com/android/get- your-videos-faster-with-videobee-for-android/), 2013, 1-7 (7 pages).
Flurry Analytics, "Flurry Grows with You," Yahoo Developer Network (http://developer.yahoo.com/analytics), 2015, 1-6 (6 pages).
Graziano, "AT&T's 4G LTE network found to be the fastest in the U.S.," (http://bgr.com/2013/06/17/4g-lte-speeds-att-verizon-sprint-t-mobile), 2013, 1-3 (3 pages).
Han et al., "Cellular Traffic Offloading Through Opportunistic Communications: A Case Study," Proc. 5th ACM Workshop on Challenged Networks (CHANTS), 2010, 31-38 (8 pages).
Hui et al., "Bubble Rap: Social-based Forwarding in Delay Tolerant Networks," Proceeding MobiHoc '08 Proceedings of the 9th ACM international symposium on Mobile ad hoc networking and computing Hong Kong, Hong Kong, China, 2008, 241-250 (10 pages).
Ionnandis et al., "Optimal and Scalable Distribution of Content Updates Over a Mobile Social Network," Proceedings of the 2009 IEEE INFOCOM, 2009, 1422-1430 (9 pages).
Jahed et al., "Practical Device-Centric WiFi/Cellular Link Aggregation Mechanism for Mobile Devices," IEEE 2015 11th International Conference on Innovations in Information Technology, 2015, 17-22 (6 pages).
Keller et al., "MicroCast: Cooperative Video Streaming on Smartphones," MobiSys '12—Proceedings of the 10th International Conference on Mobile Systems, Applications, and Services, 2012, 57-69 (13 pages).
Kim et al., "Multi-Source Multi-Path HTTP (mHTTP): A Proposal," arXiv.1310.2748 (arXiv:1310.2748v3 [cs.NI]), 1-12 (12 pages).
Lawler, "YouTube Android app update brings HD video streaming to capable 2.2+ devices," http://www.engadget.com/2012/03/02/youtube-android-app-update-brings-hd-video-streaming-to-capable, Engadet, 2012, 2-4 (3 pages).
Lopez, "Download and share videos quickly thanks to VideoBee for Android," Android Ayuda (http://androidayuda.com/2013/11/09/descarga-y-comparte-videos-rapidamente-gracias-videobee-para-android/), 2013, 1-5 (5 pages).
Marketing Charts, "Top 10 Mobile-Phone Websites Aug. 2013," (http://www.marketingcharts.com/updates/top-10-mobile-phone-websites-august-2013/36523/), 2013, 1-7 (7 pages).
Mobile Time, "VideoBee: app creates "cooperative" streaming between mobile," Mobile Time, (http://www.mobiletime.com.br/19/12/2013/ videobee-app-cria-streaming-cooperative-entre-celulares/364820/news.aspx), 2013, 1-2 (2 pages).
Mobisys, "Program," MobiSys 2012, The Tenth International Conference on Mobile Systems, Applications, and Services, Low Wood Bay, Lake District, United Kingdom, 2012 1-5 (5 pages).
Multipath, "MultiPath TCP—Linux Kernel implementation," (http://www.multipath-4cp.org/) 2015, 1-3 (3 pages).
National Science Foundation, "I-Corps: MicroCast Cooperative Networking of Mobile Devices, Award Abstract: 1258866," (http://www.nsf.gov/awardsearch/showAward?AWD_ID=1258866), 2012, 1-2 (2 pages).
National Science Foundation, "SBIR Phase I: MicroCast Cooperative Video Delivery to Mobile Devices, Award Abstract: 1315106," (http://www.nsf.gov/awardsearch/showAward?AWD_ID=1315106), 2013, 1-2 (2 pages).
Netflix, "Internet Connection Speed Recommendations," https://help.netflix.com/en/node/306, 2016, 1-2 (2 pages).
Oliva et al., "IP Flow Mobility: Smart Traffic Offload for Future Wireless Networks", Interdigital (https://www.interdigital.com/research_papers/2011_01_03_ip_flow_mobility__smart_traffic_offload_for_future_wireless_networks), 2011. 2-10 (9 pages).
Pantos et al., "HTTP Live Streaming," (http://tools.ietf.org/html/draft-pantos-http-live-streaming-12), IETF Trust Internet Draft, 1-42 (42 pages).
Reisinger, "Can Apple's App Store maintain its lead over Google Play?," https://www.cnet.com/news/can-apples-app-store-maintain-its-lead-over-google-play/, 2012, 1-3 (3 pages).
Rodriguez et al., "MAR: A Commuter Router Infrastructure for the Mobile Internet," MobiSys '04 Proceedings of the 2nd international conference on Mobile systems, applications, and services, 2004, 217-230 (14 pages).
Samsung, "What is S Beam, and how do I use it?," (http://www.samsung.com/us/support/supportOwnersHowToGuidePopup.do?howto_guide_seq=7042&prd_ia_cd=N0000003&map_ seq=48157, 1-2 (2 pages).
Sharafeddine et al., "Optimized device centric aggregation mechanisms for mobile devices with multiple wireless interfaces," Computer Networks, 2017, 1-16, 129(2017).
Shoelace Wireless, "The MobiCom First Mobile App Competition, 2013," MobiCom 2013 The 19th Annual International Conference on Mobile Computing and Networking (http://www.sigmobile.org/mobicom/2013/app_winners.html), 2013, 1-2 (2 pages).
Shoelace Wireless, "VideoBee—Stream & Download—Android Apps on Google Play," (https://play.google.com/store/apps/details?id=sw.video&hl=en), 2016, 1-3 (3 pages).
Soroush et al., "Spider: Improving Mobile Networking with Concurrent Wi-Fi Connections," SIG-COMM '11 Computer Communication Review, 2011, 402-403, 4·1(4) (2 pages).
Stiemerling et al., "A System for Peer-to-Peer Video Streaming in Resource Constrained Mobile Environments," Proceedings of the 1st ACM Workshop on User-provided Networking: Challenges and Opportunities (U-NET), 2009, 25-30 (6 pages).
T-Mobile, "Smartphone Mobile Hotspot FAQs," T-Mobile Support (https://support.t-mobile.com/docs/DOC-9847), 2016, 1-2 (2 pages).
Tsao et al., "On Effectively Exploiting Multiple Wireless Interfaces in Mobile Hosts," Proceedings of the 5thInternational Conference on Emerging Networking Experiments and Technologies (CoNEXT), 337-348 (12 pages).

\* cited by examiner

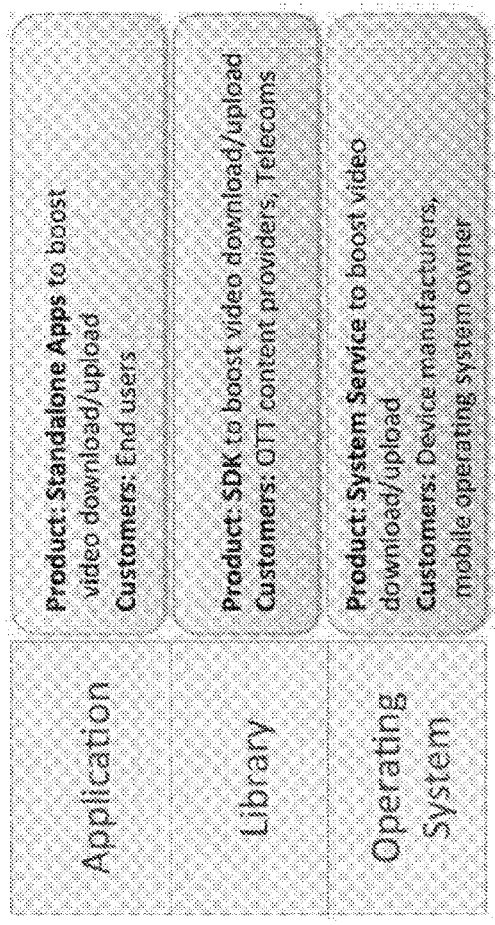
Figure 13: Possible implementations of our technology at different layers of the protocol stack and the corresponding beneficiaries.
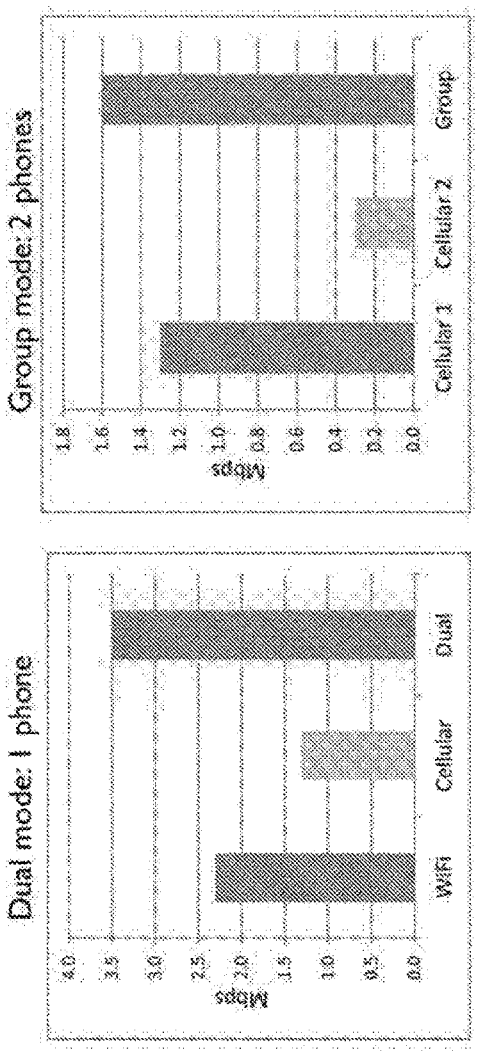
Figure 14: Example of the performance of Solo and Group Mode of VideoBee in the lab.

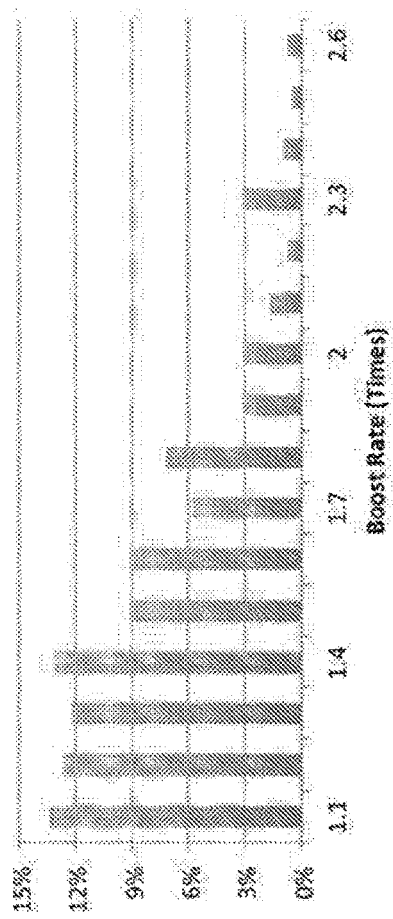
Figure 15: Example of the performance of VideoBee in the wild: Solo mode, histogram of improvement ratio over WiFi alone.
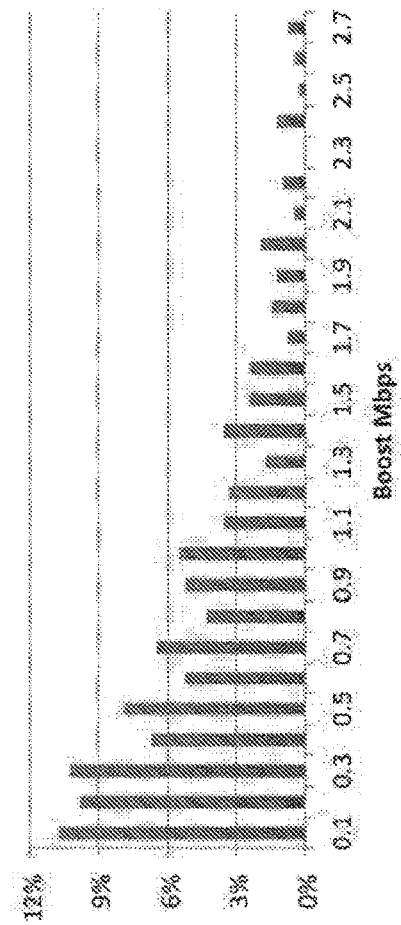
Figure 16: Example of the performance of VideoBee in the wild: Solo mode, histogram of the Mbps cellular contribution.

SYSTEMS FOR IMPROVED MULTI-CHANNEL NETWORK CONNECTIVITY PERFORMANCE AND SECURITY

CROSS REFERENCE

This application is a continuation of U.S. Non-Provisional patent application Ser. No. 15/134,201, filed Apr. 20, 2016 and claims benefit of U.S. Provisional Patent Application No. 62/150,250, filed Apr. 20, 2015, and U.S. Provisional Patent Application No. 62/196,583, filed Jul. 24, 2015, the specification(s) of which is/are incorporated herein in their entirety by reference.

FIELD OF THE INVENTION

The present invention relates to systems and methods for improving mobile Internet, in particular, combining multiple wireless networks to boost mobile Internet speed and secure mobile Internet traffic.

BACKGROUND OF THE INVENTION

Mobile devices, such as smart phones and tablets, have become ubiquitous. According to recent statistics, people already spent more time on the Internet using their mobile apps than on traditional desktop computers. Since these mobile devices connect to the Internet using wireless networks, such as Wi-Fi and 3G/4G connections, they have created an unprecedented strain on the wireless infrastructure that has already fell far behind. Users tend to experiences low mobile Internet in many places such as at a coffee shop, at an airport, on a train, or at a conference. The current wireless network speed cannot keep up with the demand. According to recent statistics, the average Wi-Fi and cellular speed in the US is below 4.8 and 3.7 Mbps, respectively. This speed is not enough to stream 720p videos, let alone full HD 1080p or quad HD videos that the consumers desire as their smartphones are now equipped with these high-resolution screens. Furthermore, gap between the demand and supply of cellular wireless bandwidth is only going to increase in the next years. For instance, it is predicted that 70% of World's population will have a smart phone and 60% of all mobile data traffic will be from online video by 2020. According to the latest Mobile Data Forecast by Cisco's Visual Networking Index, it is estimated that by 2019, the mobile speed will grow only 2 times while the demand for mobile data will grow 10 times.

Insufficient bandwidth results in poor user experience, plagued by low definition content, video stalling, etc. This, in turn, translates to billions of loss in revenue due to reduced user engagement. For example, Conviva reported that global premium content brands lost $2.16 billion of revenue in 2012 due to poor quality video streams and are expected to miss out on an astounding $20 billion through 2017 if they do not fix the video streaming quality problems. Wi-Fi is increasingly used by mobile users for bandwidth-intensive applications, for both speed and cost purposes, and also by cellular operators to offload their traffic. However, Wi-Fi alone is not sufficient since its coverage is not as ubiquitous as cellular, and most Wi-Fi networks in public spaces are typically congested. Hence, there is a need to resolve the problem of slow mobile Internet speed.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The subject disclosure features systems and methods that efficiently combine multiple wireless networks or devices for faster mobile Internet, increase network reliability, enhance Internet security and privacy protection, provide multi-network insight on data consumption and network performance, and provide quality of experience based on class of service.

An embodiment of the present invention features a method of boosting mobile Internet speed comprising operating a Virtual Private Network (VPN) service application to route outgoing and incoming data packets of a mobile device, and coupling the mobile device to a remote server through the VPN service application for data packets transfer between the remote server and the mobile device. Another embodiment of the present invention features a mobile device with boosted mobile Internet speed. The mobile device may comprise a Virtual Private Network (VPN) service application operated in background of the mobile device to route outgoing and incoming data packets of a mobile device, and a virtual network interface established by service application for the data packets transfer between the mobile device and a remote server.

A further embodiment of the present invention features a Virtual Private Network (VPN) server to boost Internet speed of a mobile device. The VPN server may comprise a plurality of network sockets for data packets transfer between the mobile device and the VPN server, and a data packet forwarding component coupled to the plurality of network sockets and capable of forwarding data packets sent by the mobile device to a sending target host and retrieving data packets requested by the mobile device from a retrieving target host.

A method of concurrently using multiple channels to secure data packets transfer that comprises sending encrypted data packets concurrently over multiple channels, and receiving the encrypted data packets by a single apparatus is also described herein.

Additional embodiments include a method for data packets transfer between a mobile device and a remote server. The method may comprise designating a first plurality of data packets to be transferred via a Wi-Fi channel, designating a second plurality of data packets to be transferred via a cellular channel, and transferring concurrently the first plurality of data packets and the second plurality of data packets using both the Wi-Fi channel and the cellular channel.

BRIEF DESCRIPTION OF THE DRAWINGS

FIG. 13 shows possible implementations of our technology at different layers of the protocol stack and corresponding beneficiaries. First, we can develop standalone mobile apps, as we did with the Android app VideoBee, that end-users can directly use to enjoy faster download. Second, we can provide an SDK that can be used by content providers inside their mobile apps to speed up the video delivery to their users. Finally, our technology can be implemented as a service at the operating system level, transparently to the user and other apps. Device manufacturers or mobile operating system owners can incorporate this technology inside their products to offer a competitive performance to their clients.

FIG. 14 plots an example of the performance of VideoBee in our lab experiments, for both the Solo mode and the Group Mode. For this example, we used the following experimental setup: we connect in a group two smartphones, (1) a Galaxy Nexus with Verizon 4G, and (2) a Samsung Captivate with AT&T 3G. For the WiFi connection, we connect to a wireless AP 802.11 router. We download the same 3-min YouTube video 5 times, using the same placement of phones in all scenarios, and report the average download speed. In the Solo Mode we download the video using first only the cellular connection, second, only the WiFi connection, and third, both connections (reported as Dual) with our technology. We verify that our technology enables to achieve the sum speed of the WiFi and cellular connections. In the group mode, we download using first each of the smartphones alone (reported as Cellular 1 and Cellular 2), and then when we connect them in a group and aggregate their connections. We verify that in the Group mode we download at the sum of the two cellular connections.

FIG. 15 plots an example of the performance of VideoBee in the wild, that is, by processing from data we collected from our user's statistics. We consider Progressive Video Downloading in Solo Mode. We plot the histogram of the ratio of the speed we can achieve when using both interfaces with VideoBee, over using WiFi only; this captures the improvement we achieve over using WiFi alone.

FIG. 16 plots an example of the performance of VideoBee Solo Mode Progressive Video Downloading in the wild, where we now depict the histogram of the rate in Mbps that the cellular connection contributes to the WiFi connection.

DESCRIPTION OF PREFERRED EMBODIMENTS

Figure 1A:
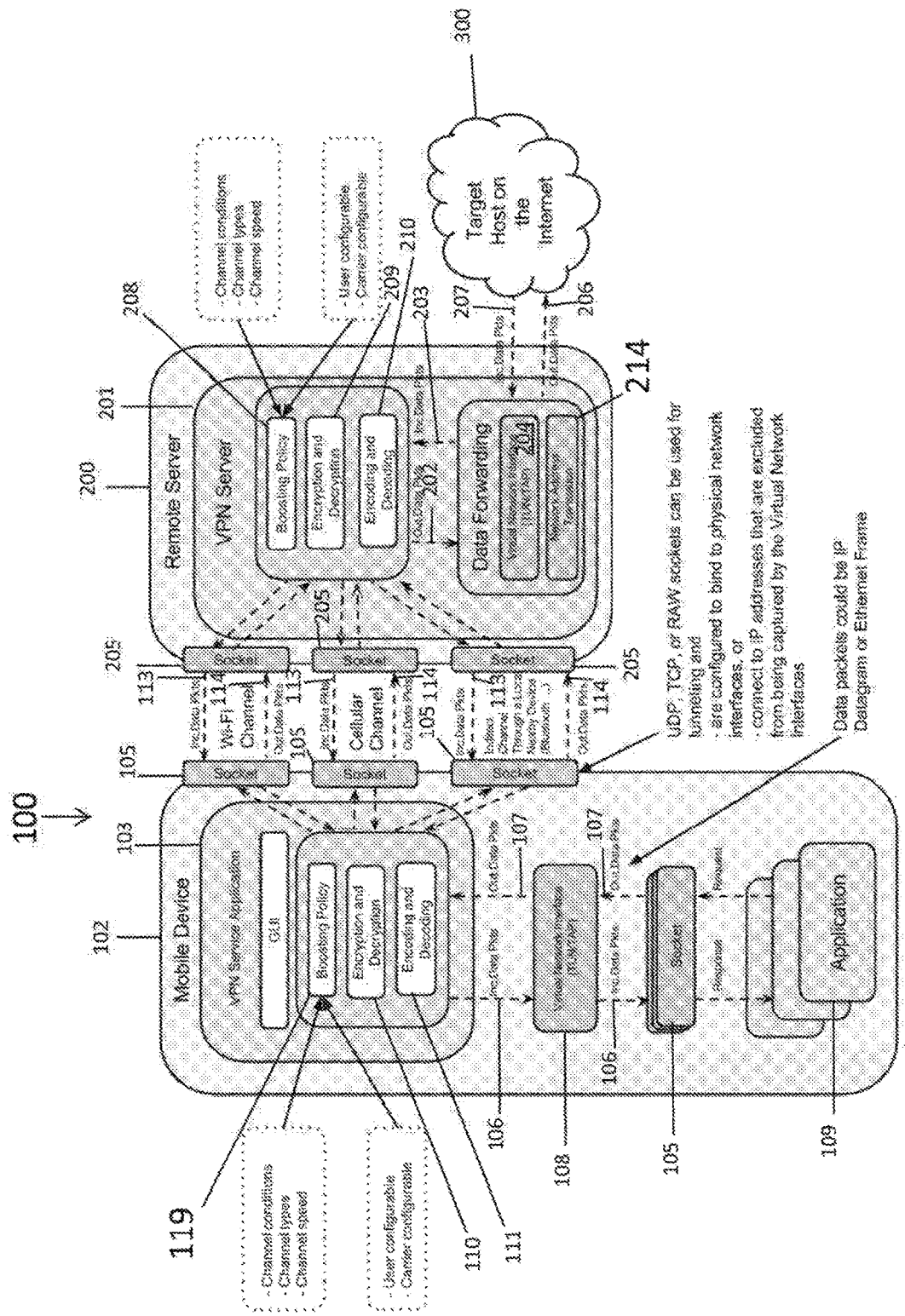
FIGS. 1A-E show an exemplary embodiment of the present invention featuring a system for boosting and securing all traffic on a mobile device using multiple wireless channels simultaneously with the help of a remote VPN server.

As shown in FIG. 1, the present invention is a system for increasing the speed of mobile Internet traffic. The system comprises at least one mobile device (102) and a remote server (200), capable of communicating with each other over a plurality of data channels, where the channels are of different types (ex. Wi-Fi (115), cellular (116), and Bluetooth (117)). In a primary embodiment of the present invention, the mobile device (102) is configured to operate a Virtual Private Network (VPN) service application (103), wherein the service application establishes a virtual network interface (108). The operating system of the mobile device (102) is configured to route a set of outgoing packets (107) to this interface and to receive a set of incoming packets (106) from this interface, while the virtual network interface (108) sends the outgoing data packets to the remote server (200) using network sockets coupled to the VPN service application (103). In a typical embodiment the VPN service application (103), reads the set of outgoing packets (107) from the virtual network interface (108), assigns each outgoing packet (107) to one of the plurality of channels, and sends the set of outgoing packets to the remote server (200) via the assigned channels (115,116,117). The service application (109) also receives a set of incoming data packets from the remote server (200), wherein the incoming packets are received through the plurality of channels, and writes the incoming packets to the virtual network interface (108).

In a primary embodiment the remote server (200) communicates with a plurality of target hosts (300) on the Internet. The remote server (200) receives the set of outgoing packets from the mobile device (102) via the plurality of channels, forwards the set of outgoing packets to the target hosts (300), receives the set of incoming packets (207) from target hosts (300), assigns each incoming packet (207) to one of the plurality of channels, and sends the set of incoming packets to the mobile device (102) via the assigned channels (115,116,117).

In a preferred embodiment, the service application assigns packets to channels according to a boosting policy (119). In some embodiments, the boosting policy (119) is defined by an algorithm based at least on applications generating the packets, channel conditions of each of the plurality of channels, such as throughput and latency of each channel, and channel types of each of the plurality of channels.

In various embodiments, the channel types may include device-to-device connections, Wi-Fi, microcell, picocell, and standard cellular base station channels (117).

In some embodiments the boosting policy (119) contains a set of configurable options. The options may configure the boosting policy (119) to minimize cost, or to optimize speed of transmission, or to prioritize selected packet types.

In some embodiments, the boosting policy (119) selects the data packets to be sent over the plurality of channels based on the outgoing queue size of each channel, data transfer rate of each channel, and/or latency of each channel.

In some embodiments, the remote server (200) is also configured to operate a boosting policy (208), wherein the boosting policy (208) prioritizes the outgoing packets and determines which packets to assign to which channels. In some embodiments, the boosting policy (208) is defined by an algorithm based at least on applications generating the packets, channel conditions of each of the plurality of channels, such as throughput and latency of each channel, and channel types of each of the plurality of channels.

In some embodiments, the remote server (200) is a VPN server (201) and the VPN service app (103) is operated in background of the mobile device (102). In some embodiments, the data packets may be an open system interconnection (OSI) layer-3 Internet protocol (IP) datagram or OSI layer-2 ethernet frame. In some embodiments, the virtual network interface is either a TUN or a TAP interface (108).

The virtual network interface (108) may be configured to intercept outgoing data packets except the data packets with destination as the remote server (200) or a proxy server (211) that forwards the data packets to the remote server (200). In some embodiments, the network sockets (105) may comprise layer-4 user datagram protocol (UDP) sockets, layer-4 transmission control protocol (TCP) sockets, or layer-3 raw sockets. In some embodiments, the network sockets (105) sending data packets out may be configured to bind to a real physical network interface, such as a Wi-Fi (115) or cellular (116) physical interface. In varying embodiments, the multiple channels comprise at least a Wi-Fi channel (115) and a cellular channel (116), or at least two cellular channels, or at least a cellular channel (116) and a local device-to-device channel, or at least a Wi-Fi channel (115) and a local device-to-device channel (117). The local device-to-device channel may be a Bluetooth channel, a Wi-Fi direct channel, a long term evolution (LTE) direct channel or a ZigBee channel.

Also referring to FIG. 1, an embodiment of the present invention features a mobile device (102) with boosted mobile Internet speed. The mobile device (102) may comprise a Virtual Private Network (VPN) service application (103) operated in background of the mobile device (102) to route outgoing and incoming data packets of a mobile device (102), and a virtual network interface established by service application for the data packets transfer between the mobile device (102) and a remote server (200). The service application may process the outgoing data packets and send out the processed data packets using network sockets (105). The processed data packets are sent over multiple channels (115,116,117) simultaneously and the data packets are assembled after being received.

In another embodiment, the data packets are encrypted (110) using an encryption scheme or encoded (111) using a coding scheme, and then sent over multiple channels based on the boosting policy (119). The data packets may be sent over multiple channels based at least on one of outgoing queue size of each channel, data transfer rate of each channel, and latency of each channel. The data packets sent over multiple channels may be decrypted (110) if the data packets are encrypted before being sent. Also, the data packets are decoded if the data packets are encoded before being sent.

Referring to FIG. 1, an embodiment of the present invention features a Virtual Private Network (VPN) server (201) to boost Internet speed of a mobile device (102). The VPN server may comprise a plurality of network sockets for data packets transfer between the mobile device (102) and the VPN server (201), and a data packet forwarding component coupled to the plurality of network sockets (105) and capable of forwarding data packets sent by the mobile device (102) to a sending target host (300) and retrieving data packets requested by the mobile device (102) from a retrieving target host (300). The data packets may be transferred over multiple channels simultaneously and the data packets are assembled after being received. In one embodiment, the data packets are sent over multiple channels based on a boosting policy (119). In another embodiment, the data packets are encrypted using an encryption scheme or encoded using a coding scheme, and then sent over multiple channels based on the boosting policy. The boosting policy (119) may be configurable by a mobile device (102) user or by a mobile device (102) service carrier. The boosting policy (119) may be defined by an algorithm based at least on applications generating the packets, channel conditions of each of the multiple channels, wherein the channel conditions comprises throughput and latency of each channel, and channel types of each of the multiple channels, wherein the channel types comprises device-to-device connections, Wi-Fi, microcell, picocell, and standard cellular base station.

In one embodiment, at least two of the plurality of network sockets are used simultaneously for receiving data packets from the mobile device (102). In another embodiment, at least two of the plurality of network sockets are used simultaneously for sending data packets to the mobile device (102). In other embodiments, the virtual network interface (204) may couple to the sending target host (300) or the retrieving target host (300) via a network connection path. The network connection path may support Network address translation (NAT) (214) for remapping or modifying network address information within the datagram packet.

Figure 1B:
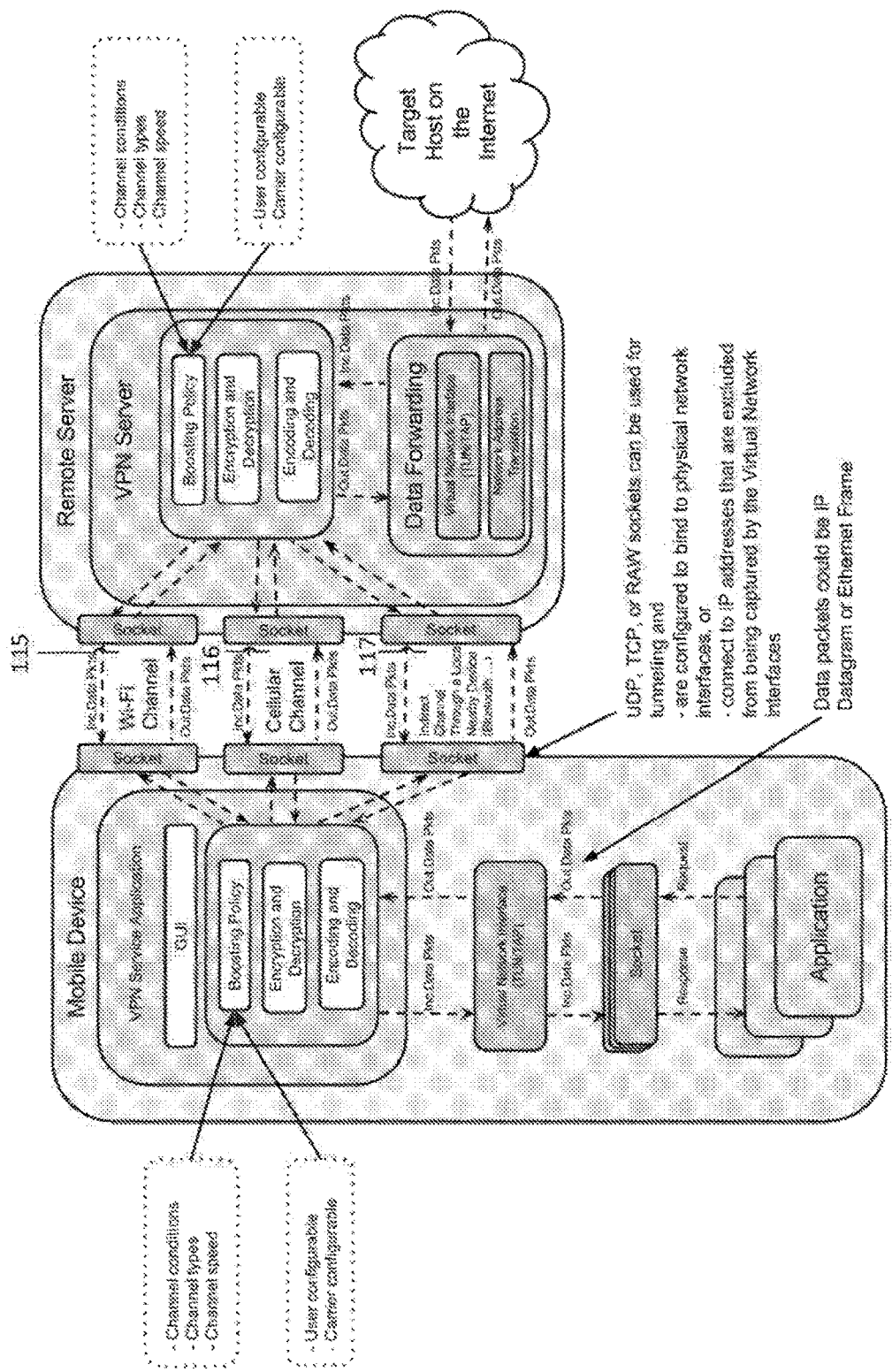

As shown in FIG. 1A-B, the use of multiple wireless channels simultaneously with the help of a remote VPN server (201) may boost and secure all traffic on a mobile device (102). In brief, this non-limiting embodiment is how the system works. Any Internet traffic, i.e., data packets (IP datagram or Ethernet frame), generated by an application is routed by the operating system to a Virtual Network Interface (204) (TUN or TAP interface). The data packets available to read from the Virtual Network Interface are then sent through multiple wireless channels simultaneously, where a channel could be Wi-Fi (115), cellular (116), or indirect (117) channel through a nearby device (e.g., by establishing a Bluetooth connection to a nearby device and the nearby device will help forwarding the packets further). The sockets used for the channels to send out the intercepted data packets could be TCP, UDP, or RAW sockets. These sockets are either configured to bind to the corresponding physical network interfaces (e.g., Wi-Fi, cellular) or just regular sockets but connect to IP addresses that were excluded in the configuration of the Virtual Network Interface (so that any traffic destined to these excluded IP addresses will not be routed to the Virtual Network Interface but will be sent directly to the target IP addresses). Before sending the data packets out, the mobile device (102) might encrypt and might encode them. The dispatch of the data packets through multiple channels follows a boosting policy that is user configurable and carrier configurable, and the policy also takes as inputs channel conditions, types, and speed, etc. The server receives data packets from multiple sockets, assembles them (reorders, decodes, decrypts, etc.), and forwards them to the target host on the Internet. One way this is done is by enabling IP forwarding and establishing a Virtual Network Interface (204) with Network Address Translation (214) on the server. Upon receiving response data packets from the remote host on the Internet, the VPN server (204) forwards them to the mobile device (102), using multiple channels simultaneously, similarly to the other direction. Upon receiving data packets from multiple sockets from the server, the mobile device (102) assembles them (reorders, decodes, decrypts, etc.), and forwards them to the application (109).

Figure 1C:
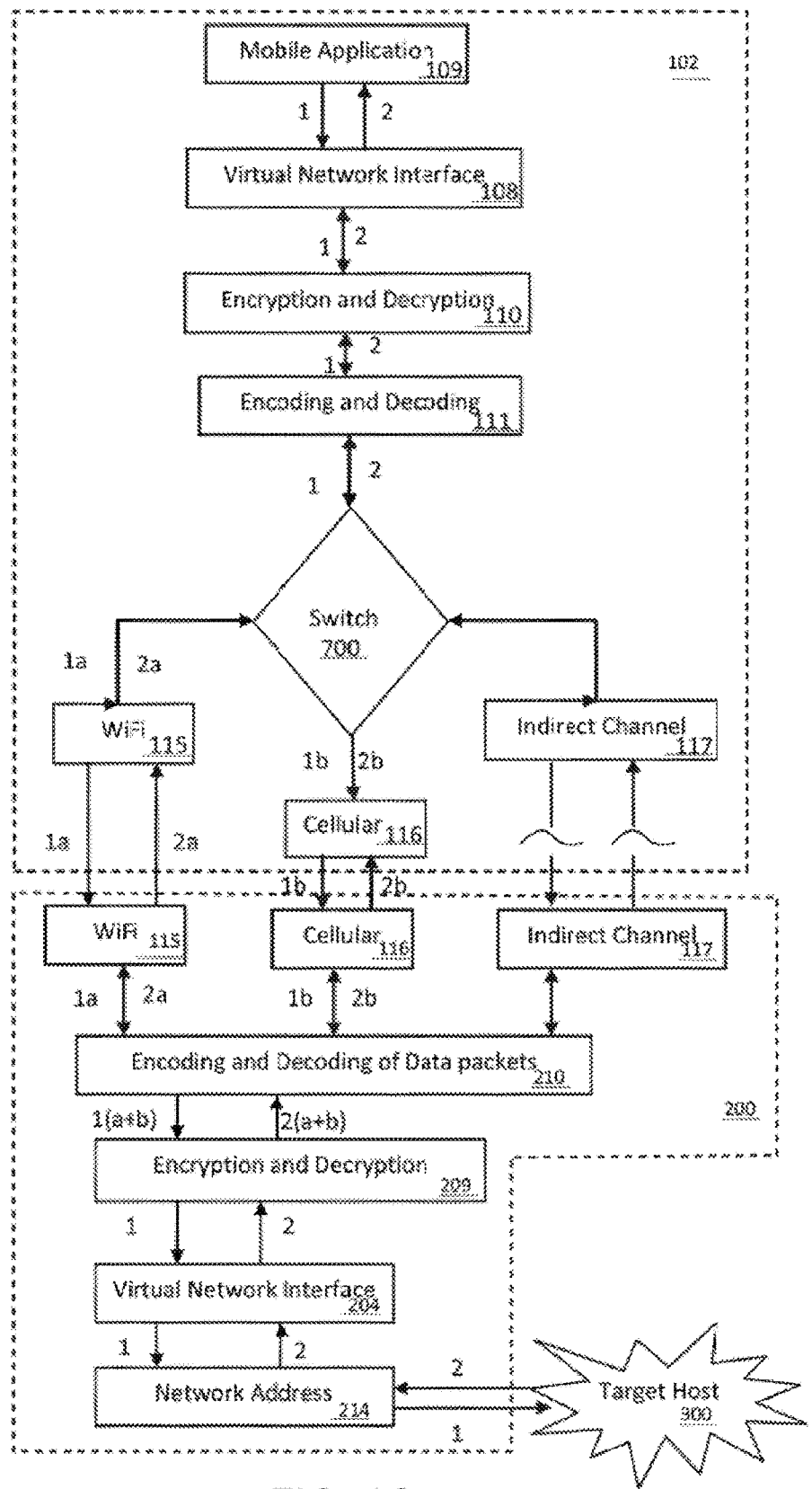

In FIG. 1C, flowchart is presented to further clarify the present invention, where "1" is designated as sending data packets to remote server (200) from mobile device (102) with use of network sockets (105). "2" is designated as receiving data packets; wherein these sending data packets divided into 2 parts. In one embodiment, sending packets are "1a" with Wi-Fi channel and "1b" with cellular channel (116). In one embodiment, network socket act as switch, which mean that transfer of data packets from mobile device (102) to remote server (200) using Wi-Fi (115) and cellular (116) channel.

In some embodiment, "2a" is designated as receiving data packets from Wi-Fi channel (115) and "2b" is designated as receiving data packets from cellular channel (116). In one embodiment, network socket act as a switch, whose main function is to resolve find specific channel, for data packets to send and received.

Figure 1D:
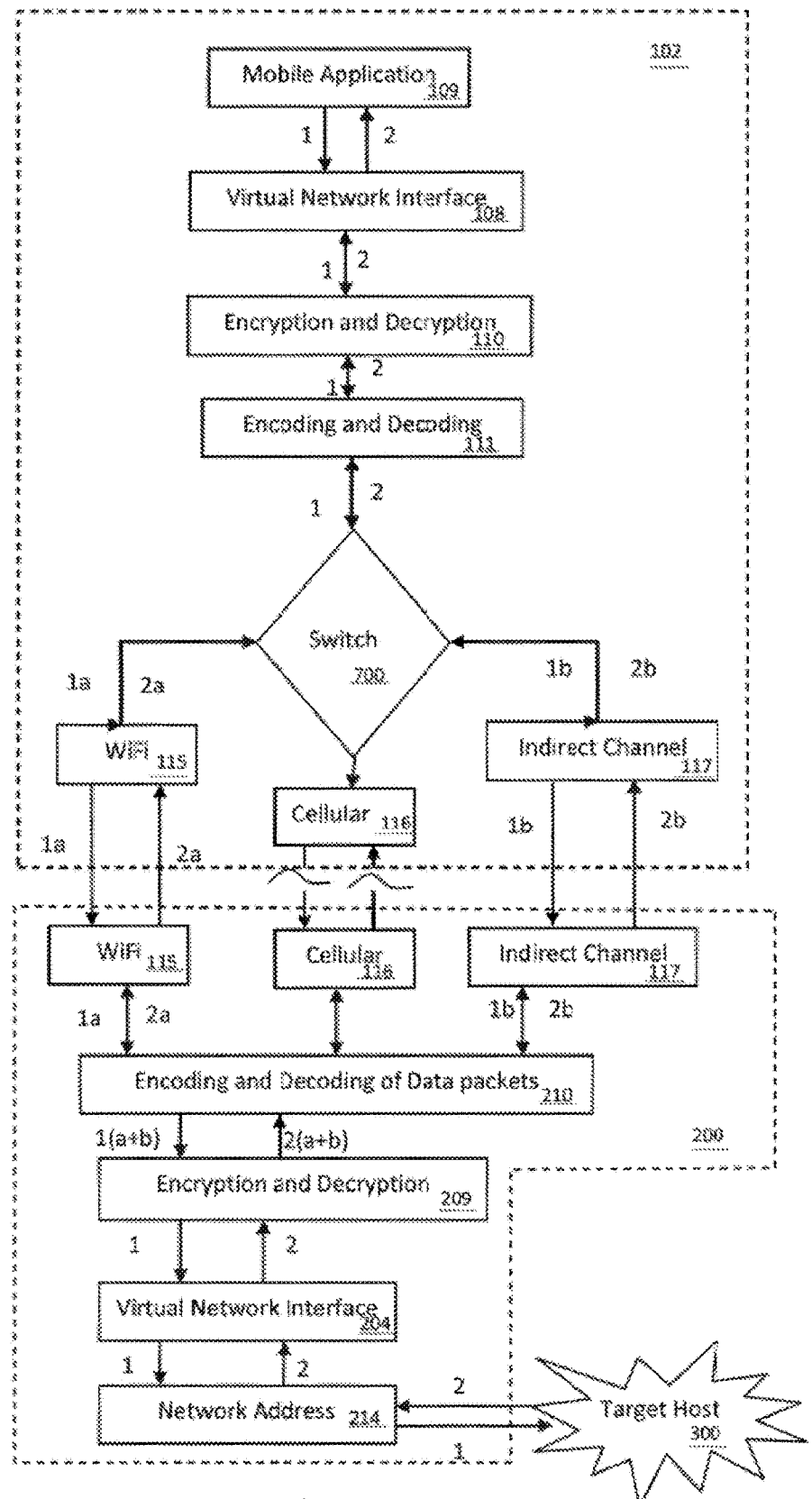

Referring to FIG. 1D, the present invention highlights an embodiment where there is no cellular channel (116) communication with remote server (200). In one embodiment, flow chart format is designated "1" as sending data packets to remote server (200) from mobile device (102) with use of network sockets and "2" is designated as receiving data packets from internet host; wherein these sending and receiving data packets divided into 2 parts.

In some embodiment, sending packets are "1a" with cellular channel (116) and "1b" with indirect channel (117). Similarly, "2a" is designated as receiving data packets from cellular channel and "2b" is designated as receiving data packets from indirect channel. The local device-to-device channel (indirect channel) may be a Bluetooth channel, a Wi-Fi direct channel, a LTE direct channel or a ZigBee channel.

Figure 1E:
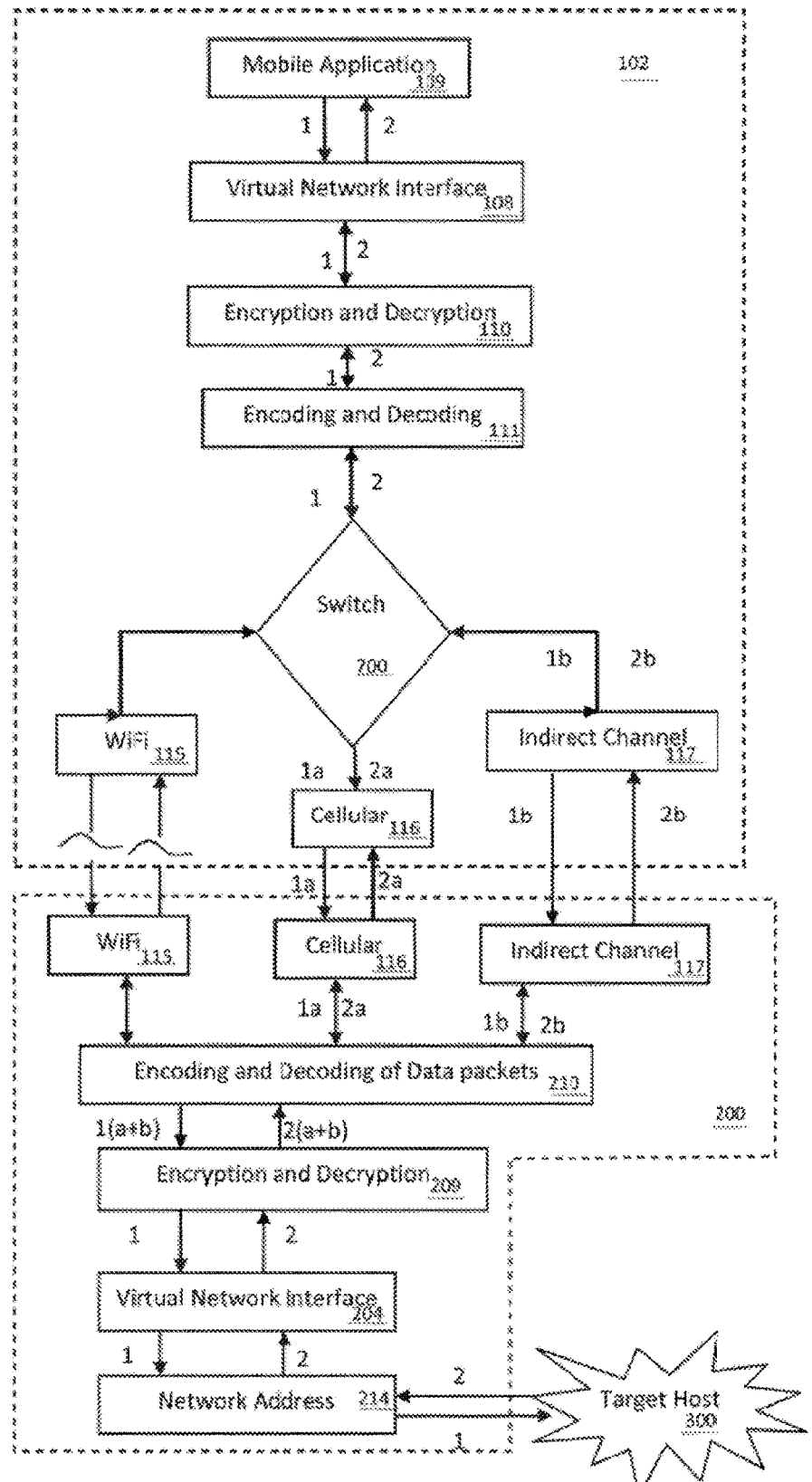

Referring now to FIG. 1E, the present invention highlights an embodiment where there is no Wi-Fi channel communication with remote server (200). In one embodiment, flow chart format is designated "1" designated as sending data packets to remote server (200) from mobile device (102) with use of network sockets and "2" is designated as received data packets; wherein these sending data packets divided into 2 parts.

In some embodiment, sending packets are "1 a" with Wi-Fi channel and "1b" with indirect channel (117). Similarly, "2a" is designated as receiving data packets from Wi-Fi channel (115) and "2b" is designated as receiving data packets from indirect channel (117). The local device-to-device channel (indirect channel) may be a Bluetooth channel, a Wi-Fi direct channel, a LTE direct channel or a ZigBee channel.

Figure 2:
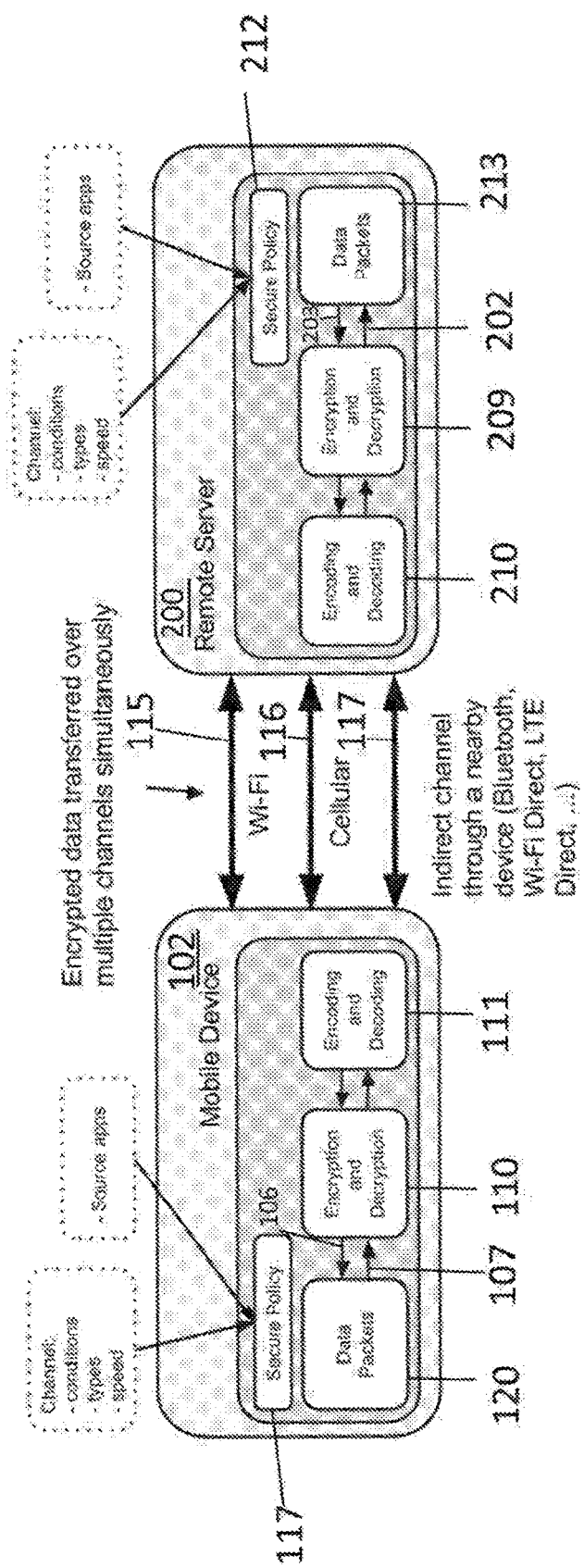
FIG. 2 shows an exemplary embodiment of the present invention featuring a method for securing all traffic on a mobile device using multiple wireless channels simultaneously.
Figure 3A:
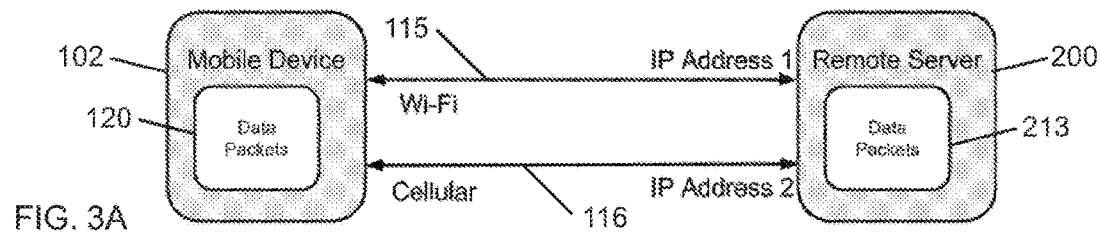
FIGS. 3A-E show exemplary embodiments of the present invention featuring a method for using Wi-Fi and cellular simultaneously on a mobile device to communicate with the same remote server.
Figure 3B:
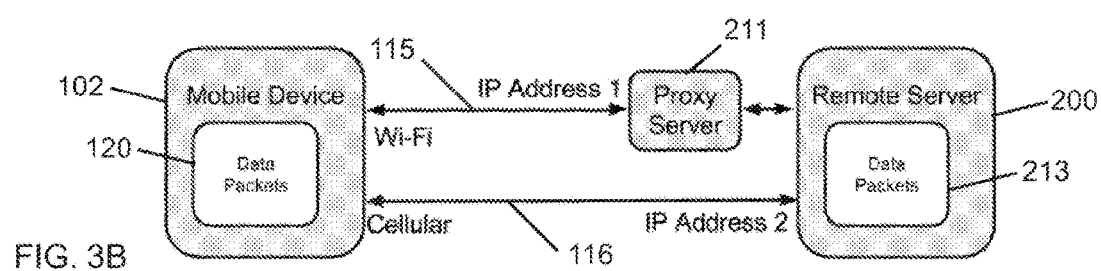
Figure 3C:
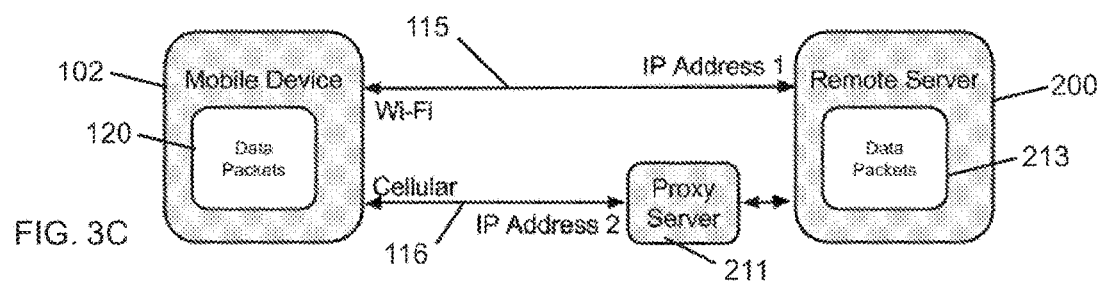
Figure 3D:
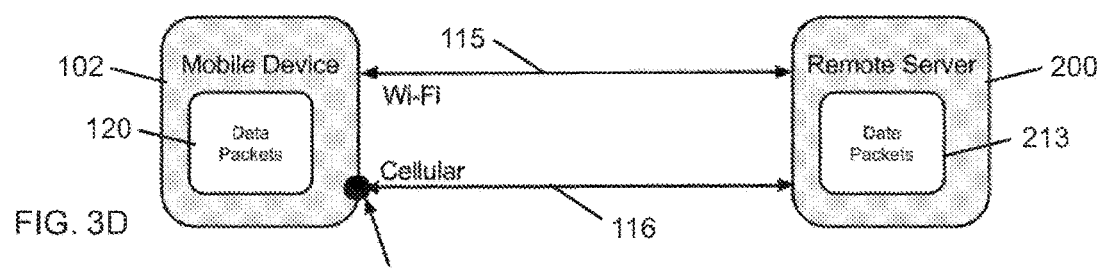
Figure 3E:
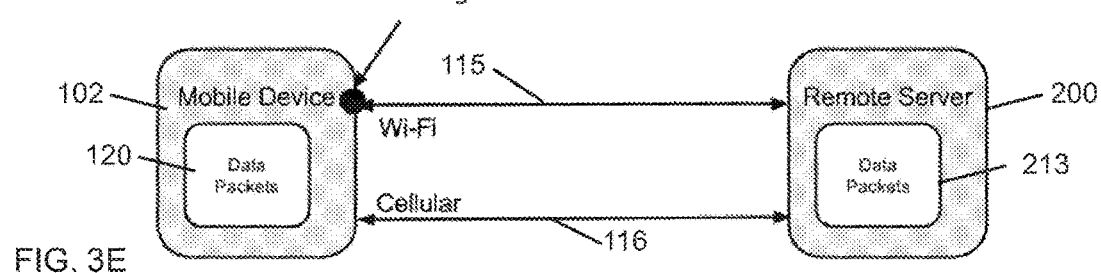

Referring now to FIG. 2, the present invention may further feature a method of concurrently using multiple channels to secure data packets transfer. In some embodiments, the method may comprise sending encrypted data packets concurrently over multiple channels, and receiving the encrypted data packets by a single apparatus. Preferably, the received encrypted data packets are assembled and decrypted. In some embodiments, the multiple channels comprise at least a Wi-Fi channel and a cellular channel, or at least two cellular channels, or at least a cellular channel and a local device-to-device channel, or at least a Wi-Fi channel and a local device-to-device channel. The local device-to-device channel may be a Bluetooth channel, a Wi-Fi direct channel, a LTE direct channel or a ZigBee channel.

In one embodiment, the encrypted data packets are sent over multiple channels based on a secure policy. In another embodiment, the encrypted data packets are encoded using a coding scheme, and then sent over multiple channels based on the secure policy. The encrypted data packets may be decoded if the encrypted data packet is encoded before being sent. The encrypted data packet may be sent based at least on factors selected from outgoing queue size of each channel, data transfer rate of each channel, and latency of each channel.

In some embodiments, the secure policy may be defined by an algorithm based at least on factors selected from applications generating the encrypted packets and channel conditions of each of the multiple channels. In other embodiments, the channel conditions may comprise channel parameters selected from throughput and latency of each channel, channel type of each of the multiple channels. In further embodiments, the channel type of each of the multiple channels is a device-to-device connection, a Wi-Fi, a microcell, a picocell, or a standard cellular-base station connection.

As shown in FIG. 2, the use of multiple wireless channels simultaneously may secure all traffic on a mobile device (102). Consider data packets (IP datagrams or Ethernet frames) routed to a Virtual Network Interface on the mobile device (102). These data packets are encrypted and encoded, and are then sent to a remote server (200) using multiple channels simultaneously based on a secure policy. This secure policy takes as input the application that generated the data packets and the channel conditions, types, and speed, etc. Upon receiving encrypted data packets from the mobile device (102), the remote server (200) assembles (reorders, decodes, decrypts) them to get the data packets. The data packets that need to be sent back to the mobile device (102) (responses from the target host) may be securely sent over multiple channels simultaneously similarly.

As shown in FIG. 3, additional embodiments of the present invention may feature a method for data packets transfer between a mobile device (102) and a remote server (200). The method may comprise designating a first plurality of data packets to be transferred via a Wi-Fi channel, designating a second plurality of data packets to be transferred via a cellular channel, and transferring concurrently the first plurality of data packets and the second plurality of data packets using both the Wi-Fi channel and the cellular channel. In one embodiment, the remote server (200) may be configured to have a first Internet protocol (IP) address to transfer the first plurality of data packets and a second IP address to transfer the second plurality of data packets, the second IP address being separate from the first IP address. In another embodiment, the remote server (200) may be configured to have a single IP address to transfer the first plurality of data packets, and the second plurality of data packets are transferred between the remote server (200) and the mobile device (102) via a proxy server (211) with an IP address different from the single IP address. In still another embodiment, the remote server (200) may be configured to have a single IP address to transfer the second plurality of data packets, and the first plurality of data packets are transferred between the remote server (200) and the mobile device (102) via a proxy server (211) with an IP address different from the single IP address.

In some embodiments, the first plurality of data packets to be transferred via the Wi-Fi channel is designated on the mobile device (102) with a default configuration or with application programming interface (API) configuration after the Wi-Fi channel connection is enabled on the mobile device (102), and the second plurality of data packets to be transferred via the cellular channel is designated on the mobile device (102) with a default configuration or with application programming interface (API) configuration after the cellular channel connection is enabled on the mobile device (102).

In other embodiments, the first plurality of data packets to be transferred via the Wi-Fi channel is designated by selecting sockets that are already bound to the Wi-Fi channel or by binding selected network sockets on the mobile device (102) to the Wi-Fi channel after the Wi-Fi channel is enabled on the mobile device (102) and then using these sockets to send the first plurality of data packets, and the second plurality of data packets to be transferred via the cellular channel is designated by selecting sockets that are already bound to the cellular channel or by binding selected network sockets on the mobile device (102) to the cellular channel after the cellular channel is enabled on the mobile device (102) and then using these sockets to send the second plurality of data packets.

As shown in FIG. 3, a Wi-Fi channel (115) and a cellular channel (116) may be used simultaneously on a mobile device (102) to communicate with the same remote server (200) in several ways, following two classes of approaches: (i) the mobile device (102) connects to two different IP addresses for Wi-Fi (115) and cellular (116) connections (FIG. 3A, 3B, 3C), either connecting directly to the remote server (200) (FIG. 3A) or through a proxy server (211) (FIG. 3B, 3C); and (ii) the mobile device (102) explicitly binds at least a socket to a physical interface (cellular as in FIG. 3D, or Wi-Fi as in FIG. 3E).

Keeping at least two channels active at the same time when available (even when the secondary channel is not used to transfer data) is a key technique to providing seamless connectivity across multiple networks. For example, let us assume that we have two available channels: WiFi and cellular, and WiFi is the current primary interface. If the cellular interface is not kept active but only activated when WiFi is disconnected, then there are several seconds of delays for the OS to activate the cellular interface (before it can be used). This may result in disruptions in transporting IP datagrams or Ethernet frames between the mobile device and the VPN server, thereby disconnecting current TCP/UDP sessions of the applications.

Figure 4A:
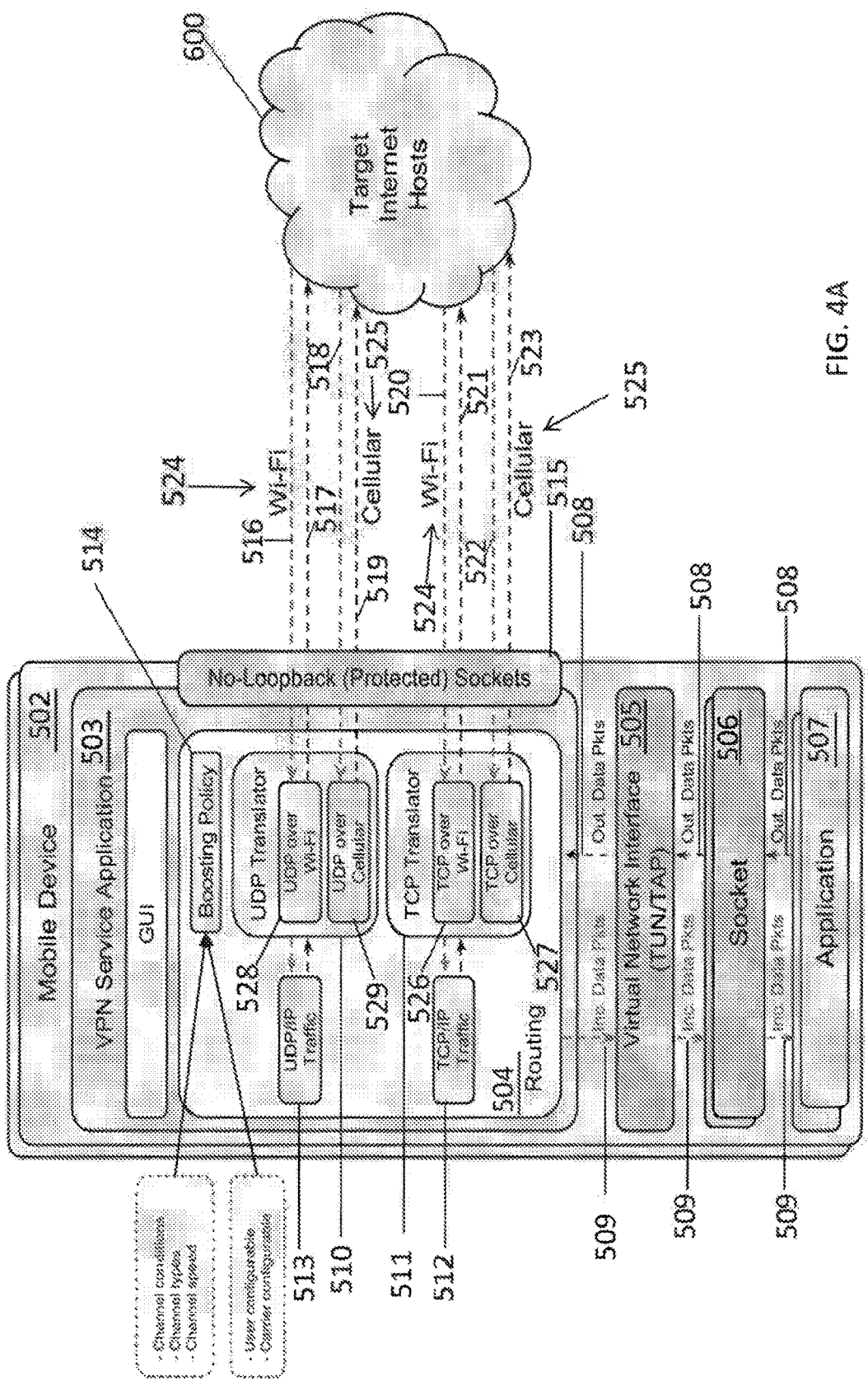
FIGS. 4A-C show an exemplary embodiment of the present invention featuring a system for routing and boosting all traffic on a mobile device using two wireless channels simultaneously without the help of a remote VPN server.

As shown in FIG. 4A, the present invention is a system for increasing the speed of mobile Internet traffic. The system comprises at least one mobile device (502), capable of communicating with Target host (600) over user datagram protocol (UDP)/transmission control protocol (TCP) routing data channels, where the channels are of different types (ex. Wi-Fi (524) and cellular (525)). In a primary embodiment of the present invention, the mobile device (502) is configured to operate a Virtual Private Network (VPN) service application (503), wherein the service application establishes a virtual network interface (505). The operating system of the mobile device (502) is configured to route, a set of outgoing packets to this interface and to receive a set of incoming packets from this interface, while the virtual network interface (505) sends the outgoing data packets to the target host (600) using network sockets coupled to the VPN service application (503). In a typical embodiment the VPN service application (503), reads the set of outgoing packets from the virtual network interface (505), assigns each outgoing packet to one of the routing of channels, and sends the set of outgoing packets to the target host via the assigned channels. The service application also receives a set of incoming data packets from the host, wherein the incoming packets are received through the UDP/TCP of channels, and writes the incoming packets to the virtual network interface (505).

In some embodiment, the service application assigns packets to channels according to a boosting policy (514). In some embodiments, the boosting policy (514) is defined by an algorithm based at least on applications generating the packets, channel conditions of each of the routing process, such as throughput and latency of each channel, and channel types of each of transfer channels.

In some embodiments the boosting policy (514) contains a set of configurable options. The options may configure the boosting policy (514) to minimize cost, or to optimize speed of transmission, or to select routing process for send and receiving packet types.

In some embodiments, the boosting policy (514) selects the data packets to be sent over the different routing of channels based on the outgoing queue size of each channel, data transfer rate of each channel, and/or latency of each channel.

Also referring to FIG. 4A, an embodiment of the present invention features a mobile device (502) with boosted (514) mobile Internet speed. The mobile device (502) may comprise a Virtual Private Network (VPN) service application (503) operated in background of the mobile device (502) to route outgoing and incoming data packets of a mobile device (502), and a virtual network interface (505) established by service application for the data packets transfer between the mobile device (502) and a target host (600). The service application may process the outgoing data packets and send out the processed data packets using network sockets. The processed data packets are sent over multiple channels (524,525) simultaneously and the data packets are assembled after being received.

In some embodiment, the data packets sent over multiple channels (524,525) based on the routing process which provided by user datagram protocol (UDP)/transmission control protocol (TCP) and boosting policy (514). The data packets may be sent over multiple channels based at least on one of outgoing queue size of each channel, data transfer rate of each channel, and latency of each channel.

In brief, this non-limiting embodiment is how the system works. Data from the packets are sent to their target hosts by performing a translation between Layer-3 datagrams (or Layer-2 frames) and Layer-4 packets, so that data can be sent out to the Internet using regular UDP/TCP sockets. In particular, for outgoing traffic, data of the IP datagrams (or Ethernet frames) has to be extracted and sent directly to the target hosts through UDP/TCP sockets. When a target host responds, its response data is read from the UDP/TCP sockets and must be wrapped in IP datagrams (and Ethernet frames), which are then written to the TUN (or TAP) interface.

Also, this non-limiting embodiment is how the boosting of the Internet speed is achieved by the system for different traffic types. The boosting is achieved by simultaneously using multiple layer-4 UDP/TCP sockets to speed up either UDP or TCP traffic. These sockets are configured to bind to the appropriate interfaces, either Wi-Fi or cellular, and also configured to be no-loopback to the virtual network interface (e.g., protected sockets). Four boosting example cases: (1) Multiple TCP connections to different target hosts: TCP connection targeting host A can be assigned to TCP Wi-Fi and another TCP connection targeting host B can be assigned to TCP Cellular. (2) Single TCP connection to the same target host: Depending on the application layer protocol, a single TCP connection might be able to be broken down into multiple TCP connections, e.g., each connection fetching a sub-range of a range of data in HTTP Range Request. Then these connections can be assigned to Wi-Fi and cellular simultaneously. When the sub-ranges of the original range are fetched, they are reassembled before being sent to the Virtual Network Interface to ensure packet data order. (3) Multiple UDP connections to different target hosts: UDP connection targeting host A can be assigned to UDP Wi-Fi and another UDP connection targeting host B can be assigned to UDP Cellular. (4) Single UDP connection to the same target host: Depending on the application layer protocol, a single UDP connection might be able to be broken down into multiple UDP connections, e.g., each connection fetching a piece of data like in HTTP Range Request for TCP. Then these connections can be assigned to Wi-Fi and cellular simultaneously as above.

Figure 4B:
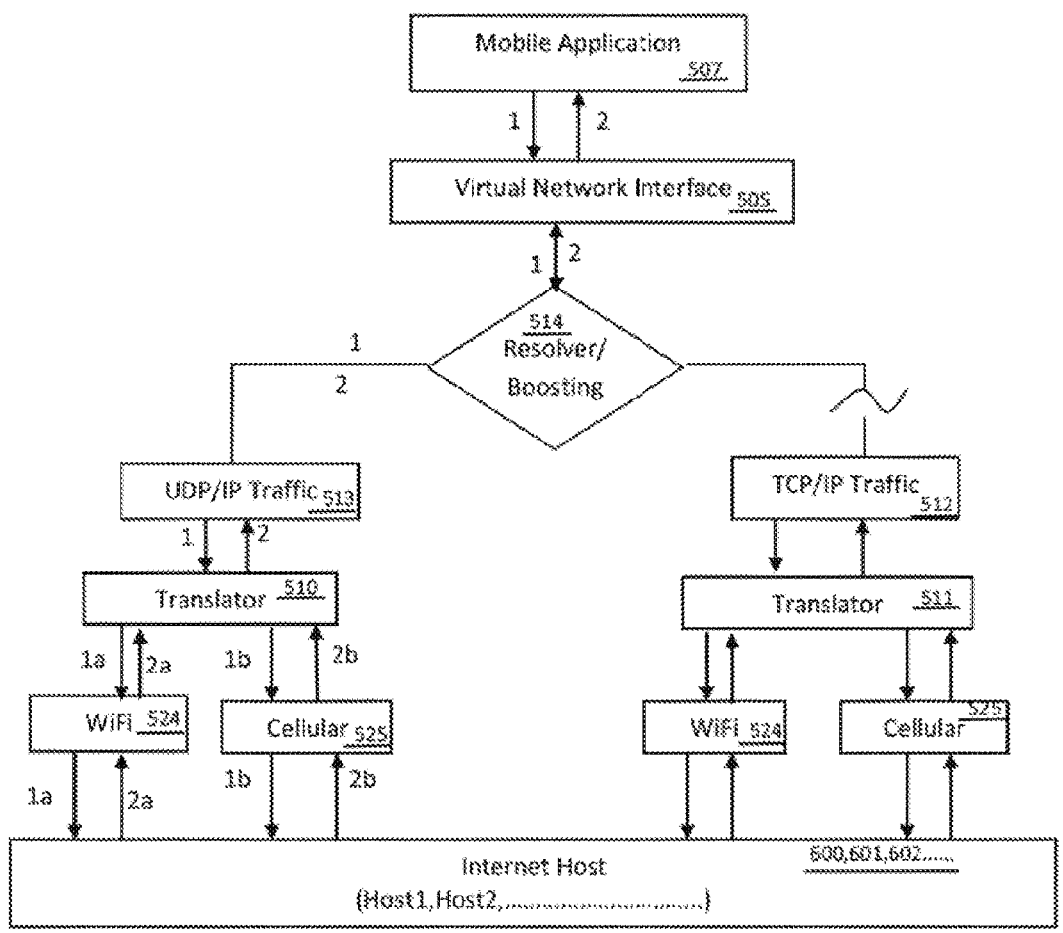
Figure 4C:
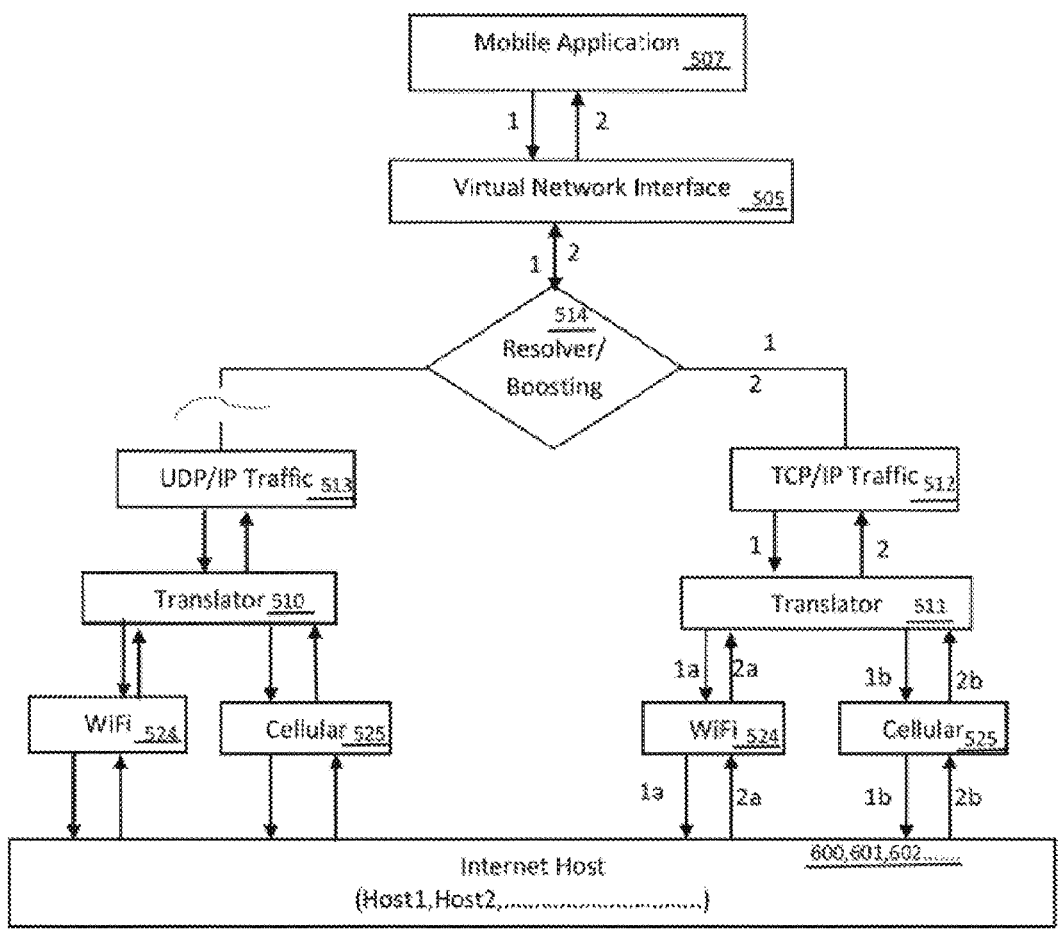

In FIG. 4B-C, flowchart is presented to further clarify the present invention, where "1" is designated as sending data packets to target host (600) from mobile device (502) with use of protected sockets (515) and "2" is designated as receiving data packets; wherein these sending data packets divided into 2 parts. In one embodiment, sending packets are "1a" with Wi-Fi channel (524) and "1b" with cellular channel (525).

In some embodiment, "2a" is designated as receiving data packets from Wi-Fi channel (524) and "2b" is designated as receiving data packets from cellular channel (525).

Referring now to FIG. 4C, the present invention highlights an embodiment where there is no communication with UDP (510) routing process. In one embodiment, where "1" in flowchart, is designated as sending data packets to target host (600) from mobile device (502) with use of network sockets and "2" is designated as received data packets; wherein these sending data packets divided into 2 parts. In one embodiment, sending packets are 1a with Wi-Fi channel (524) and 1b with cellular channel (525).

Figure 5A:
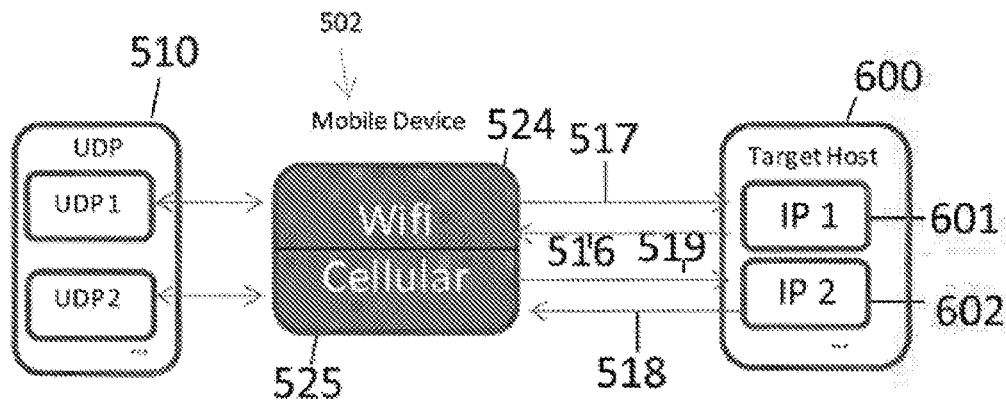
FIGS. 5A and 6A show exemplary embodiments of the present invention featuring a system for using Wi-Fi and cellular simultaneously on a mobile device to communicate with the different target host using multiple user datagram protocol (UDP) or transmission control protocol (TCP) connections for multiple UDP or TCP connections.
Figure 5B:
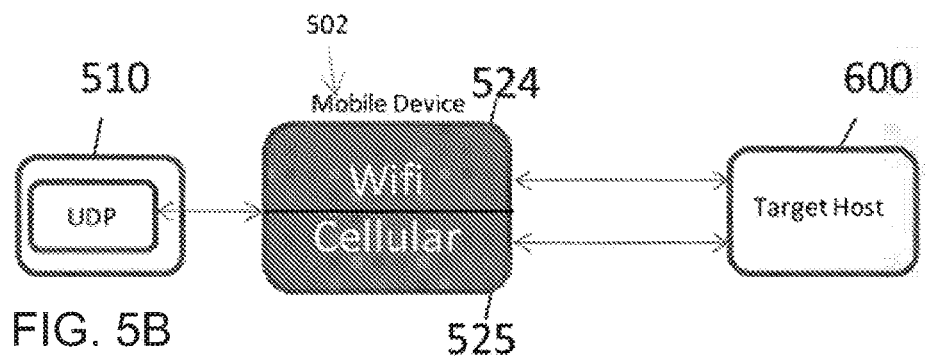
FIGS. 5B and 6B show exemplary embodiments of the present invention featuring a system for using Wi-Fi and cellular simultaneously on a mobile device to communicate with the single target host using multiple UDP or TCP connections for a single UDP or TCP connection.
Figure 6A:
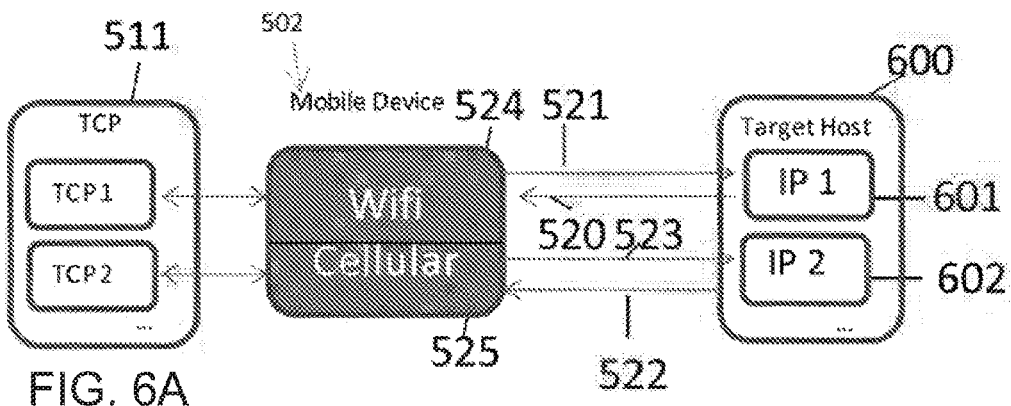
Figure 6B:
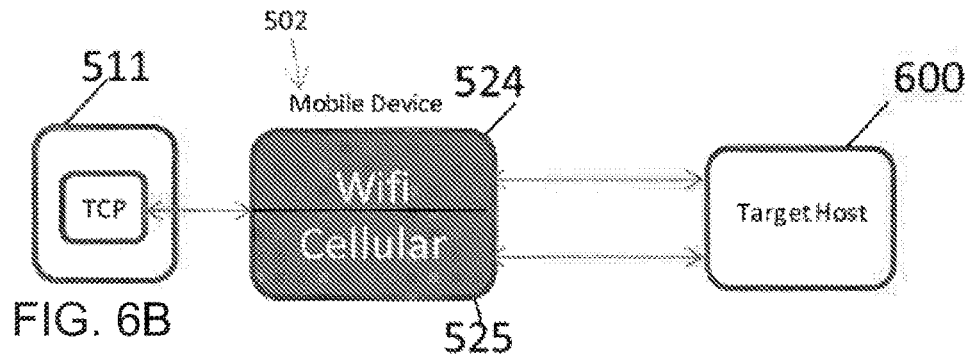
Figure 5C:
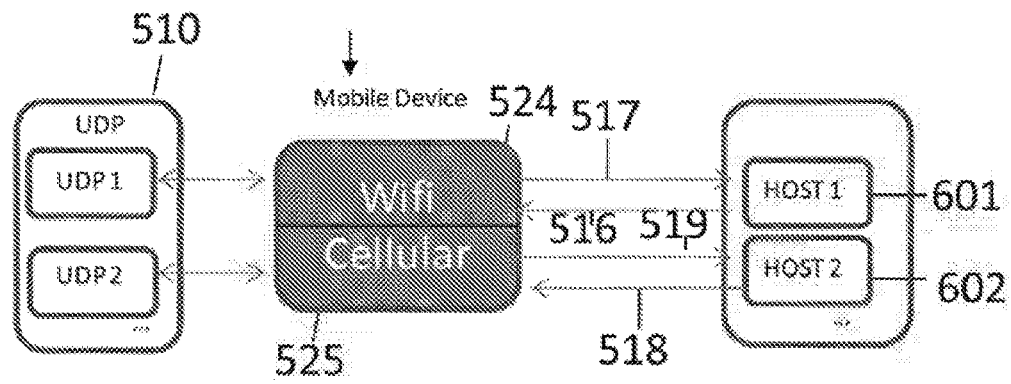
FIGS. 5C and 6C show exemplary embodiments of the present invention featuring a system for using Wi-Fi and cellular simultaneously on a mobile device to communicate with the different target host using multiple user datagram protocol (UDP) or transmission control protocol (TCP) connections for multiple UDP or TCP connections.
Figure 6C:
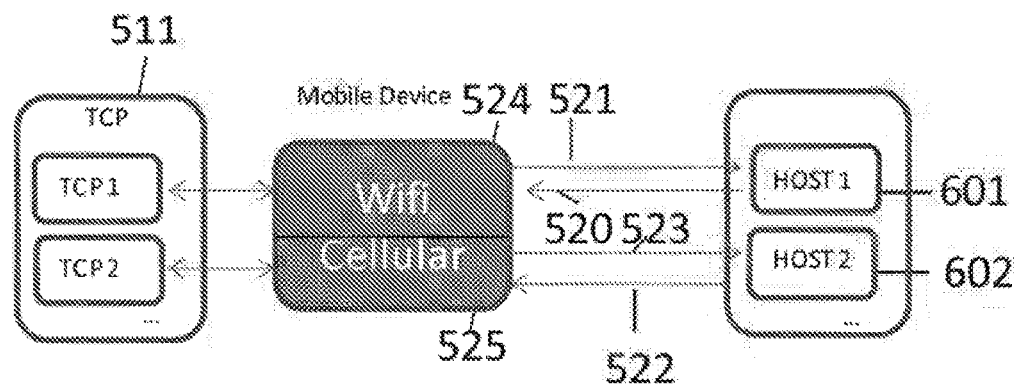

As shown in FIG. 5-6, a Wi-Fi channel (524) and a cellular channel (525) may be used simultaneously on a mobile device (502) to communicate with the target host (600) in several ways, following two classes of approaches: (i) the mobile device (502) connects to two different target IPs (601, 602) of the same target host (600) or two different target hosts for Wi-Fi (524) and cellular connections (525) (FIG. 5A, 6A, 5C, 6C); and (ii) the mobile device (502) connects to single target IP of the same target host(600) for Wi-Fi (524) and cellular (525) connections (FIG. 5B, 6B).

Boost SDK

The bandwidth of several network connections that belong either to the same device or to a group of proximal devices, to download or upload the same content (for example, the same video), using a software-only solution. In the following, we use BMV (Boosting Mobile Video) to refer to one embodiment of our software system. We refer to Solo Mode to describe the case where we aggregate the network connections of a single device.

In solo mode, our technology can be used by devices that have multiple network interfaces, such as Android smartphones, tablets, and video players. For instance, a user in an airport attempting to download a video, can use our technology to aggregate the airport WiFi connection with his own cellular connection so that he downloads the video by simultaneously using his WiFi and cellular connection.

Explaining with examples, how this technology can be implemented. Our software can be deployed at several layers of the protocol stack as shown in the Taxonomy in FIG. 13. First, at the application layer, we can develop standalone mobile apps, as we did with the Android app VideoBee. The end users use VideoBee to view videos inside the player of that particular application (even if the videos are streamed from many different providers). Second, we can provide an SDK that can be used by other mobile apps to speed up their mobile delivery by using multiple paths to a server, such as the Netflix mobile app. In this case, the end users use the Netflix mobile app to watch videos as usual, and our technology is used in the background to increase bandwidth, transparently to her or with her explicit permission (for example, through a notification and a boost button). Moreover, our technology can be implemented as a service at the operating system level, transparently to the user and other apps. In that scenario, the service can boost all HTTP traffic coming into the device by using multiple paths.

Figure 9:
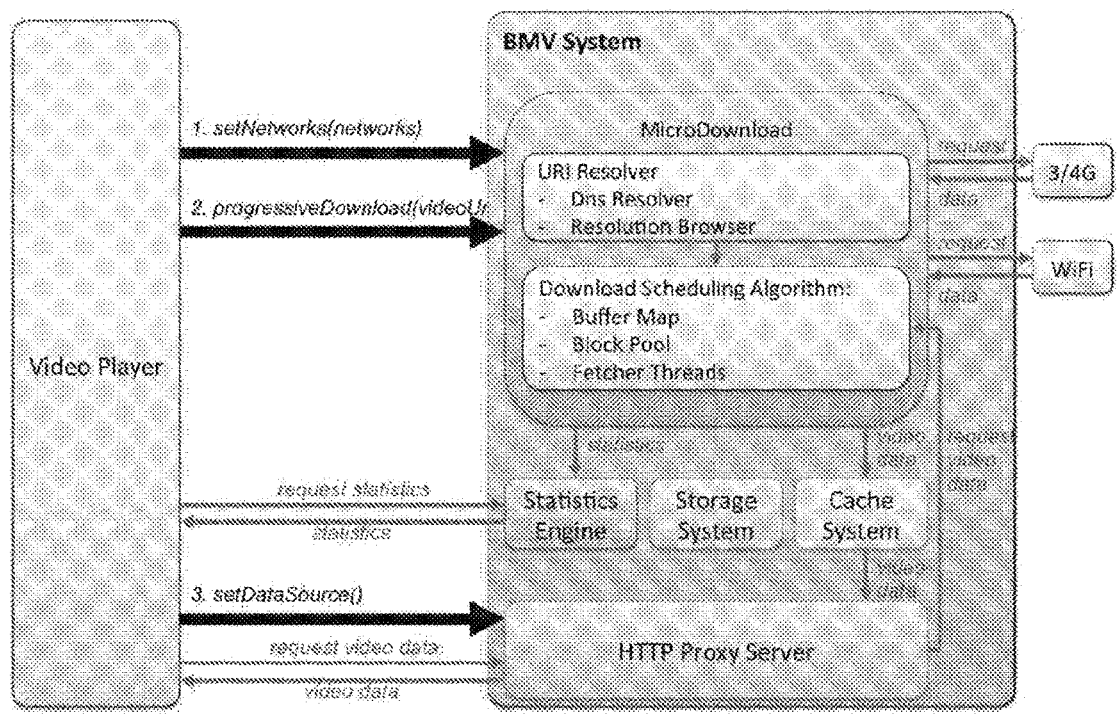
FIG. 9 shows an embodiment of the BMV Architecture and possible interactions with a Video Player when Progressive Video Downloading in Solo Mode. The BMV modular architecture consists of the following main components: Download Module, Statistics Engine, Storage System, Cache System and http proxy server. In Progressive Downloading an external video player requests a video; the blocks downloaded by Download Module are stored in the Cache; these are served to the external video player through the HTTP Proxy Server.

In some embodiments, the streaming video using BMV and the API interface. In this embodiment, the video player, e.g., the built-in player of the Android system or a third party video player like MX-Player player proceeds as shown in FIG. 9, and as follows. It first specifies which network interfaces it wants to use to download the video, by calling, e.g. setNetworks (networks), to provide the requested networks. It then starts the download by calling, for example, a function called progressive Download (video-url), where video-url (Uniform Resource Locator) of the video it wishes to play, e.g., http://remoteserver.com/video.mp4. BMV downloads video parts, stores them temporarily in a cache, and makes them locally available by offering them through a local HTTP Proxy Server. In some embodiment, the downloaded parts are made available from a local URL, for example http://localhost/video.mp4. The video player finally needs to set the location where it should fetch the video data to this local URL, e.g., by calling a function called setDataSource ("http://localhost/video.mp4"), and then fetches the video parts to playback directly from this local URL. While the download is in progress, the video player can also request various statistics from the BMV system, including data downloaded from different network interfaces, network interface's speed, etc.

Download Module is the main software responsible for downloading the video parts. In some embodiment, it establishes and simultaneously uses multiple network connections with the help of the URL Resolver; it manages which video range to download through each connection using the Scheduling Algorithm; it stores the downloaded parts using either the Cache (Progressive Downloading) or the Storage System (Regular Downloading).

Referring to FIG. 9, the URL resolver plays a key role in BMV. On Android devices today, we can simultaneously utilize the cellular interface and the WiFi interface (without rooting the device), provided that each of the two interfaces connects to a different IP address. Thus the challenge is how this can be achieved while still downloading parts of the same content through each of these interfaces. Our novel observation is that we can do that by taking advantage of the fact that popular content today is stored in several Content Distribution Networks (CDN) servers (this is the case for example for YouTube, Amazon, NetFlix, etc), that have different IP addresses. Thus, we can for example connect the cellular interface and the WiFi interface to two different CDN servers that have different IP addresses but serve the same content. To be able to do so, we need BMV to be able to fast and reliably acquire the URL addresses of the different servers of the CDN. This is exactly what the URL Resolvers does. In one embodiment, the URL resolver starts from a provided URL (e.g., http://remote-server.com/video.mp4), and identifies additional URLs that connect to different IP addresses. To achieve this, the techniques we can use include the two we next describe; which technique we use can depend on the content host we try to access.

DNS Resolver: BMV can perform an explicit domain name resolution (DNS resolution) to find at least N (with N the number of wireless interfaces) different IP addresses of the host name of the video, (in our example, of remote-server.com). It can then create N different URL addresses, by substituting each time the host name remote-server.com with one the N different IP address. We call this technique DNS Resolver. Continuing our example, assume BMV finds the IP addresses 192.168.1.1 and 192.168.1.2, it can then create the two URLs http://192.168.1.1/video.mp4, and http://192.168.1.2/video.mp4 that access the same content on different servers. To ensure that we acquire fast and reliably the required number of IP addresses, BMV perform queries that include:

- Queries to the Authoritative DNS Servers of the domain name.
- Queries to the Non-Authoritative DNS Servers of the domain name; these servers include popular public DNS servers such as Google DNS Servers, Open DNS Servers, as well as the local network DNS servers.
- Queries to its local database to find potentially stored (and not outdated) IP addresses of the host. This database is locally available and updated frequently for a certain set of popular video providers, e.g., Daily motion.

In one embodiment the queries are performed serially and the program stops once we collect a sufficient number of IP addresses. The order at which these queries are performed can depend on the application, and the user behavior. For instance, for a user often accessing the same host, the most efficient could be to locally store multiple IP addresses and check these first.

Resolution Browser: For some hosts, simply substituting a host name with an IP address does not give a valid URL, and thus the DNS resolver technique would not work. The reasons for this include:

- First, the host may incorporate inside the URL a signature that it computes for that particular URL. Substituting the host name with a different IP address without updating the signature leads to an invalid URL. The signature, however, can only be calculated by the host. As an example, a YouTube video's URL that contains a signature would be of the form: http://m.voutube-.com/watch?v=videold&sionature=AAA.
- Second, in some cases the host may also insert the source IP address of the browser in the URL and compute a signature over the IP address of the browser, so as to prevent the URL to be used by a client that has a different IP address. For instance, a YouTube's video URL of this format could be http://m.youtube.com/watch?v=videold&source_ip=1.2.3.4&signature=AAA.

Since different interfaces have different IP addresses, a URL found by a browser over a WiFi interface cannot be used to download video over a cellular interface. To address this case, one embodiment of BMV features a built in web browser called Resolution Browser. The Resolution Browser is capable of browsing a page multiple times to directly acquire different URLs of the same video (video servers generate different URL's for load-balancing reasons). It can also instantiate browsing instances over different network interfaces, thus directly acquiring the URL to be used over that interface (eg. it browses the webpage using the cellular interface to acquire the URL to be used with the cellular interface). For example, BMV running on a mobile phone and using the browser over WiFi may acquire the URL http://proxy1.remote-server.com/video.mp4?sourceIP=7.7.7.1&sign=AAAA and using the browser over cellular may acquire the URLhttp://proxy2.remote-server.com/video.mp4?sourceIP=7.7.7.2&sign=BBBB. where 7.7.7.1 is the WiFi IP address and 7.7.7.2 is the cellular IP address of the mobile phone. BMV can also check that proxy1.remote-server.com and proxy2.remote-server.com resolve to two different IP addresses (as is necessary to simultaneously use WiFi and cellular). If they happen to resolve to the same IP address, BMV in one embodiment will continue browsing over one of the interfaces until it acquires a different IP address.

URL Resolver Failure: Where the resolver fails to find within a predetermined time limit URLs for all interfaces, in one embodiment BMV starts downloading utilizing the URLs it already has (note that in any case BMV has at least one URL), so that the startup time is not impacted. At some trigger, for instance, when the system reaches steady state (as we will describe late, this refers to that no urgent blocks are needed), or if a predetermined time window passes, BMV can reactivate the URL Resolver techniques to attempt to acquire the URLs for the remaining interfaces.

Figure 7A:
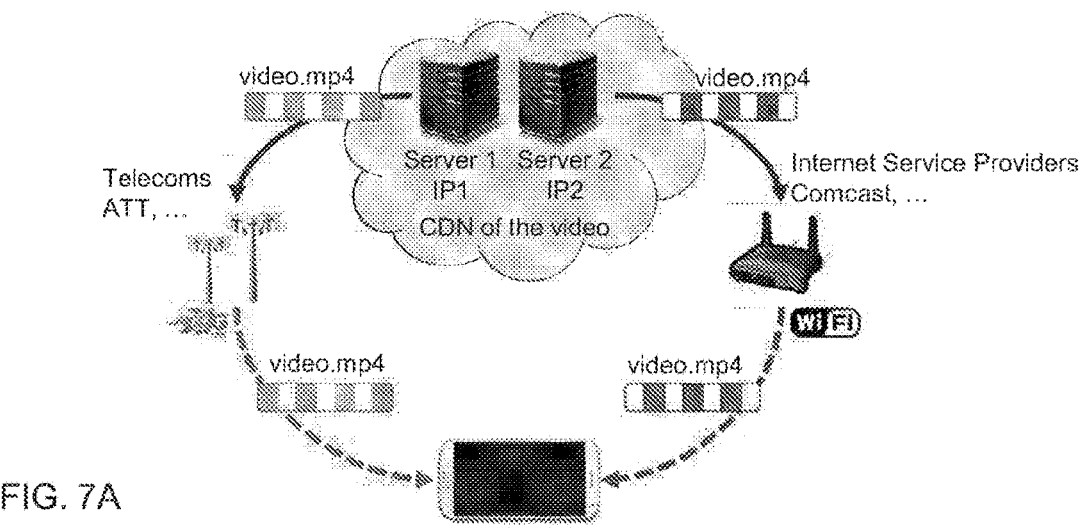
FIG. 7a shows exemplary embodiments of the Solo Mode for downloading. A single device downloads different video blocks (i.e., video segments) through two different network interfaces, cellular and WiFi, by connecting to two different CDN servers.
Figure 7B:
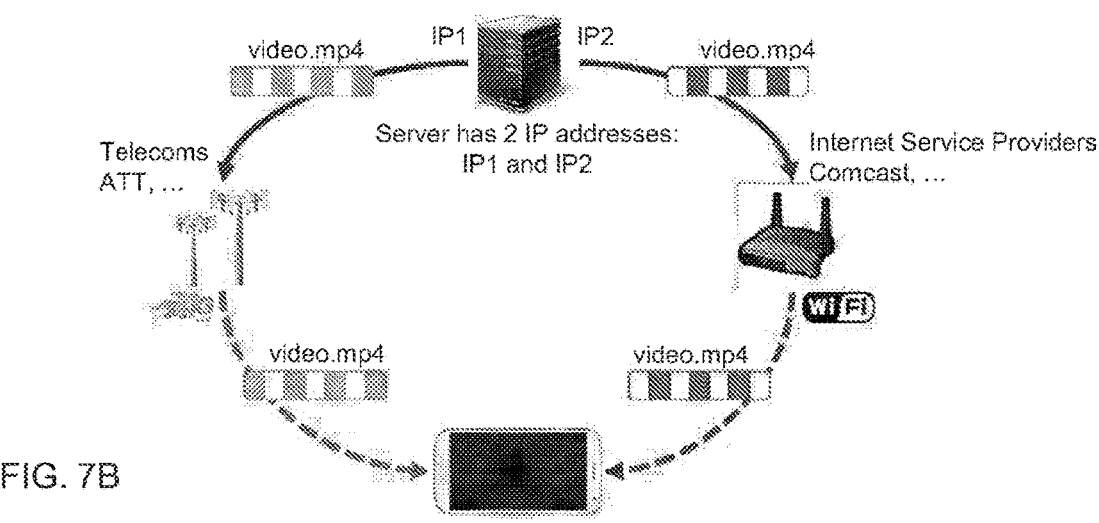
FIGS. 7b-c show exemplary embodiments of the two CDN servers could be replaced with a single server if (i) this server has 2 addressable IP addresses, as shown in FIG. 7b, or (ii) the client can route packet based on the source IP—the IP address of the each of the interfaces it has, i.e, source-based routing or policy based routing, as shown in FIG. 7c. Note that in FIG. 7b, the IP1 and IP2 are interchangeable, i.e., as long as the client connects to two different IP addresses.
Figure 7C:
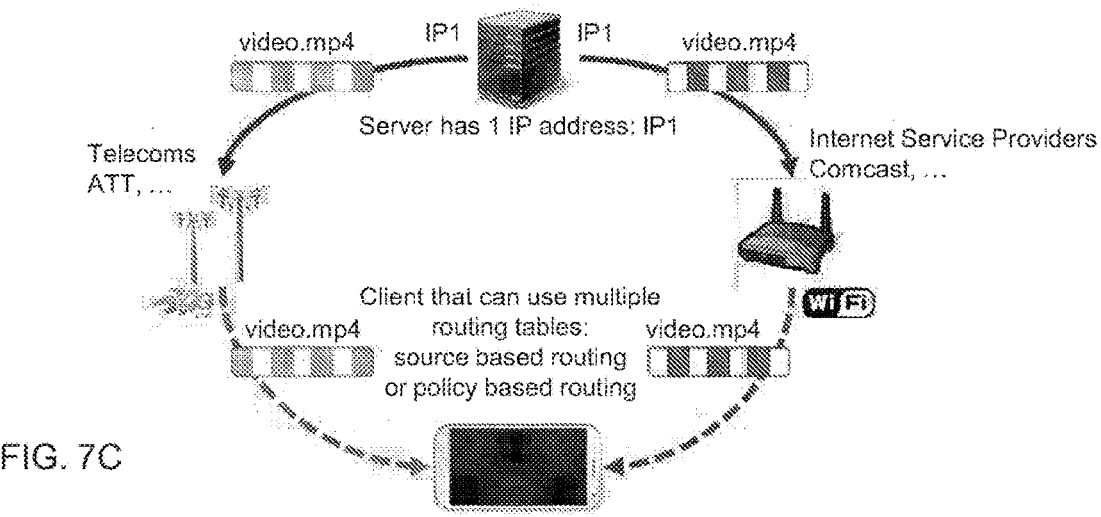
Figure 8A:
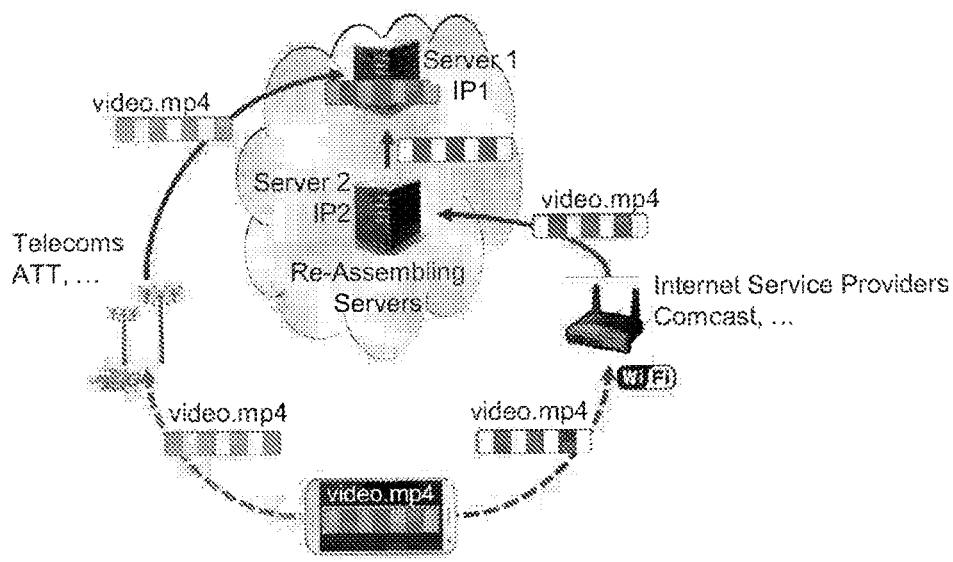
FIG. 8a shows exemplary embodiments of the Solo Mode for uploading. A single device uploads a video by sending different video blocks through a WiFi and a cellular wireless connection to two different CDN servers, Server 1 and Server 2. Server 2 sends the video blocks it receives to Server 1, who reconstructs the original video. The user experiences uploading at the sum speed of the WiFi and cellular connections.
Figure 8B:
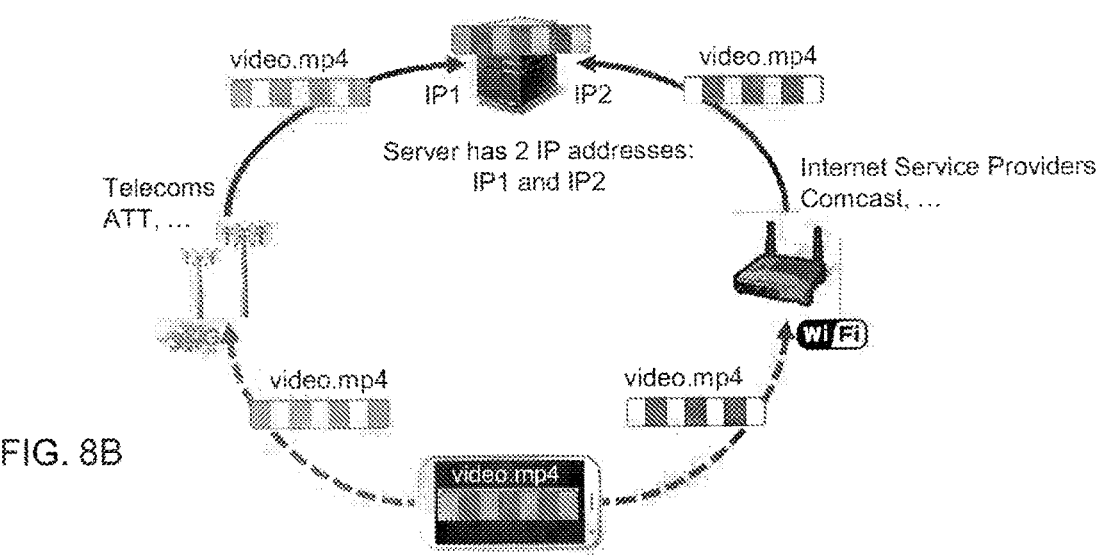
FIGS. 8b-c show exemplary embodiments of the two servers could be replaced with a single server if (i) this server has 2 addressable IP addresses, as shown in FIG. 8b, or (ii) the client can route packet based on the source IP and the IP address of the each of the interfaces it has, i.e, source based routing or policy based routing, as shown in FIG. 8c. Note that in FIG. 8b, the IP1 and IP2 are interchangeable, i.e., as long as each client connects to two different IP addresses.
Figure 8C:
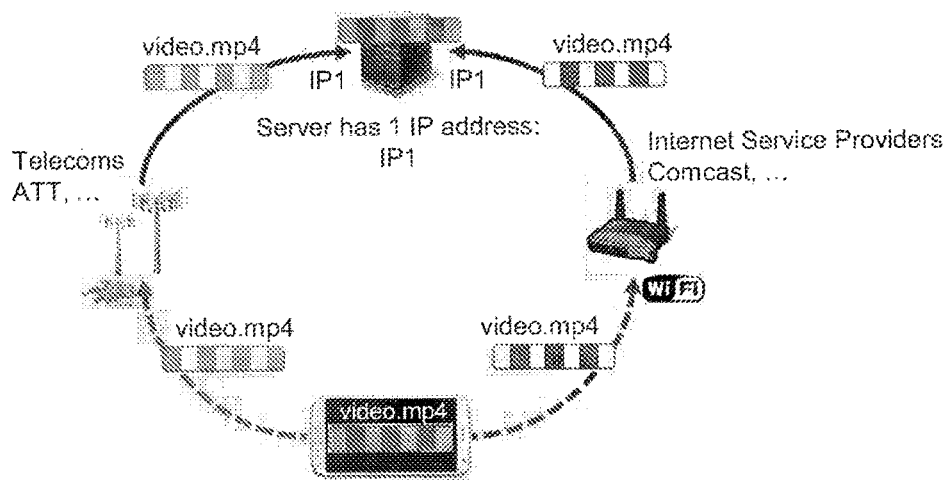

When URL Resolver not-needed: In the case when the client can route packets using multiple routing tables, i.e., by using source-based routing (based on different source IP addresses, i.e., the IP addresses of different network interfaces) or policy-based routing, the URL Resolver is not needed as the client can connect directly to a single IP using both interfaces, as illustrated in FIGS. 7c and 8c. In this case, the URL Resolver would perform the maintenance of two routing tables (source-based routing) or routing policies (policy-based routing) to make sure that packets sent through each interface are properly routing to the server.

Scheduling Algorithm

Our scheduling algorithm in one embodiment decides which parts of the content will be downloaded through each interface, and features a number of desirable properties. In particular, in this embodiment it:
- offers smooth streaming minimizing the waiting and startup time
- achieves close to the sum speed of the connections
- is robust to channel variations and lossy connections, and adjusts what part of the content we download through each interface, without having to explicitly keep track of channel statistics.
- Does not download content unless sufficiently close to the playback time, so that when users seek (change forward or backward the part of the video they would like to see) we can fast adapt.
- can operate on devices with limited storage space The Buffer Map keeps state for all the video blocks. It keeps track whether each of the video blocks is: 1) Downloaded and available; 2) currently Downloading; or 3) Missing. BMV checks whether some blocks of the video are available in the Cache. If yes, it marks them as Downloaded. All remaining video blocks are marked as Missing (case 3).

The Block Pool keeps the subset of the blocks in the Buffer Map that overlap (even partially) with the sliding window we would like to download, i.e., within time W from the playback time. This is the set of blocks available to the threads for downloading. Initially it contains all blocks within time W from time zero (starting time of the video). Block Pool is an ordered set, offering first the blocks closer to the playback time.

The Urgent Pool is a subset of the Block Pool, that keeps the set of blocks that are urgently needed, and for which we will allow more than one threads to attempt to download in parallel, as we will describe in the algorithm next. The Urgent Pool is also an ordered set, with the blocks closer to playback time offered first. The Urgent Pool may be empty; we call this desirable state "steady state". Initially, the Urgent Pool contains the first S blocks needed to start playing the video, where S is a specified parameter. The size of the urgent pool is a function of a parameter A that we call safety padding time, and that is also specified as input to the scheduling algorithm. S and Δ may be specified by BMV or the user, and can be a function of the device, content and wireless conditions.

In one embodiment the queries are performed serially and the program stops once we collect a sufficient number of IP addresses. The order at which these queries are performed can depend on the application, and the user behavior. For instance, for a user often accessing the same host, the most efficient could be to locally store multiple IP addresses and check these first.

Algorithm

Input: Parameters S, Δ, W, T1, T2, T3. Initial State: All blocks in Buffer Map are tagged missing. Block Pool contains all the blocks that are within W from the starting time. Urgent Pool contains the first S blocks from the starting time.

Retrieving from Cache:
- BMV checks whether Cache already has some of the blocks in the Buffer Map; if it finds such blocks, it tags them in the Buffer Map as Downloaded.

Threads Downloading
- Each active thread first checks the Urgent Pool; if it is empty, it then checks the Block Pool; if it is empty, it sleeps. Whenever there are new blocks added to the Urgent Pool or Block Pool, all threads are notified (wake up from sleeping and check again).
- If the Urgent Pool is not empty, the thread takes the first block, and attempts to download it; once it is downloaded it gives the block to the Cache System and tags the block as Downloaded in the Buffer Map. BMV removes the block from the Urgent Pool. Note that multiple threads may at the same time pick the first urgent block to download. We limit the number of threads that attempt to download the same block to at most one per interface.
- If the Urgent Pool is empty, but the Block Pool is not empty, the thread takes the first block in the Block Pool. The thread checks on the Buffer Map whether the block is missing or Downloading; if Missing, it marks it as Downloading and proceeds to request it from the server; if it is Downloading, it goes back to the Block Pool and checks the second block. It continues in this manner until it finds a block that is missing. Once it downloads a block, it gives it to the Cache System and marks it as Downloaded in the Buffer Map. BMV removes it from the Block Pool.

Pool Updating: Every T1 sec BMV checks the current playback time and execute a Pool Update if the playback time progresses. The execution of Pool Update can alternatively be triggered by a new playback time reception by the BMV (from the video player). The Pool Update is done as follows:
- If a block in the Urgent Pool or the Block Pool is before the current playback time, it removes it. Similarly, if a block is not within W after the playback time, it also removes it. Such cases can occur when the user seeks and changes the playback time forward or backward.
- It adds to the Block Pool all blocks that are not marked Downloaded in the Buffer Map, and are (even partially) within W from the playback time.
- It adds to the Urgent Pool all missing blocks that are within Δ of the playback time.
- It checks each block tagged as Downloading by a thread in the Buffer Map, and uses the following test to decide whether to move it to the Urgent Pool. Let P denote the video elapsing time until the block needs to be played. BMV computes an estimated time D for the thread to download the block, by dividing the estimated network interface speed with the product of the number of active threads of this interface and the block size. If D+Δ<P, then BMV moves the block to the Urgent Pool and marks it as Missing on the Buffer Map (so that other threads may pick it up).

Statistics Engine

BMV every T2 sec calculates statistics that include: The estimated network interface speed for each interface, by counting the amount of data downloaded through the interface during the last T4 sec, where typical values for T4 are 1, 10, 20, 30 sec. To be able to do so, we keep track of which thread downloaded which block in the Statistics Engine as shown in FIG. 9 [Progressive Downloading API].

Thread failing: It is possible that while downloading a video, one or more of the threads lose connectivity; for instance, consider a user connected to cellular and to the Starbucks WiFi that walks out of the coffee shop. At that point she may lose the Starbucks WiFi network, yet the cellular network (that is now outdoors) may become stronger. In one embodiment, BMV does not stop downloading the video when one or more threads fail; downloading continues through the other threads, who pick up the remaining blocks. Thus partial network loss does not interrupt the user experience.

Other user choices for scheduling: We can easily modify the algorithm so that, instead of achieving the sum speed of the connections, it achieves other user-defined criteria. For example:

Cap on data plan: A user may specify that she wishes to only use her data plan (cellular connection) up to a limit and then notified. BMV keeps track of the amount of data downloaded by each thread in the Statistics Engine; once the cap is reached, it notifies the user and stops the cellular threads.

Savings on data plan: BMV can also realize savings on the data plan, by enabling the cellular threads to only download blocks that are either within the Urgent Window, or within timeW1<W from the playback time; that is, BMV preferentially downloads segments from the Wi-Fi connection, and only assigns segments to the cellular connection if the Wi-Fi connection has not managed to download needed segments within W1.

Battery. Similarly, BMV can takes as input battery levels, and only activate download threads on a limited number of interfaces provided battery is above a certain threshold (notify the user).

Regular Downloading: We no longer maintain an Urgent Pool. All blocks are placed in the Block Pool, picked up sequentially and downloaded by threads. If all blocks are Downloaded or Downloading, we enable threads to pick up blocks that have been Downloading beyond the estimated download time D of the downloading thread, in order to avoid incomplete download due to failing threads.

The threads provide the downloaded blocks to the Storage System instead of the Cache System.

The Cache System of BMV is designed to support efficient storing and querying of the downloaded block by multiple threads at the same time, in one embodiment by combining a custom database and the file system. Storage in small files. In this embodiment, the basic idea is that each block is stored in a different small file in the file system, instead of collecting all the blocks of the video inside the same file. As a result, multiple threads can simultaneously write on (or read from) the file system without blocking each other (as they would do if they were trying to write to the same file). Each thread inserts first a row in a custom database table that keeps metadata about the block, e.g., video identifier, start byte, end byte, length, access time, as well as a pointer to a small file that will contain the data of the block; it then proceeds to store the block in the file system. This approach provides faster writing time compared to the traditional approach of keeping a single file for a video. This is because in the latter approach, writing a block entails a random write to the file, which takes significantly longer time as there is a seek involved. To support the Progressive Mode, the Cache System also provides a querying interface where metadata as well as data ranges of a video available in the Cache can be retrieved by the HTTP Proxy Server as shown in FIG. 9 [Progressive Downloading].

Eviction Policy: In order to support devices with constrained storage space, the Cache System may have a configurable maximum size, e.g., 50 MB the maximum amount of data it can store at any given time. When a thread is to write a new block to the Cache and the Cache runs out of room, it will need to evict some stored data to make room for the new one. An important design choice of the Cache System is its eviction policy. BMV Cache System includes novel cache eviction policies whose goal is to always keep the most relevant data to support smooth playback. In particular, when the Cache needs to evicts data, in one embodiment, it first:

Evicts stored blocks of videos other than the currently playing video, starting from the videos that have been least recently accessed (the currently playing video is the most recently accessed).

If no such data exist, it evicts data of the playing video before the current playback time. The size of our sliding window when downloading ensures that we do not download more data than the Cache can store. However, if the user jumps while seeking, our policy slightly changes. Apart from the current playback time, we also keep track of the last played time before the jump. We evict first blocks that are before the last played time before the jump; when these are exhausted, we evict blocks before the current playback time and as far as possible from the last played time. In this way, we maintain for as long as possible blocks close to where the user stopped viewing, for the case where she decides to go back.

Storage System: To support Regular Downloading, BMV has a Storage System that is in charge of storing the downloaded video data permanently on the file system. In one embodiment, the design and implementation of the Storage System is similar to the Cache System, except that the Storage System does not have the eviction policy. The main custom functionality of the Storage System is to support efficient writing from multiple threads. If a video is completely downloaded, the Storage System allows for exporting all data of the video to a self-contained playable video file.

HTTP Proxy Server: To support Progressive Downloading, BMV offers an HTTP Proxy Server, that serves the video blocks downloaded by Download Module to the video player that has requested the help of BMV. In one embodiment, the server responses to the HTTP Range Requests of the video player comply with the HTTP 1.1 protocol. In one embodiment, the server is capable of handling multiple requests simultaneously. In one embodiment, the HTTP Proxy Server uses the HTTP Range Requests of the video player to infer the current playback time and inform the Download Module.

The components of BMV work together, consider an example of a Progressive Downloading instance: The video player communicates with the API and asks to start BMV in Progressive Mode; the HTTP Proxy Server starts and provides to the video player a local address, e.g., http://localhost/ or http://127.0.0.1. Download Module downloads blocks and stores them in the Cache System. When the video player points to the local address to fetch metadata or ranges of the video for playback, the HTTP Proxy Server query the Cache System for the requested data, and responds to the video player. This embodiment is also illustrated in FIG. 9.

BMV supports downloading of HLS video (live streaming). An HLS video is not a single file but instead consists of a collection of files, including .m3u8 index files and .ts segments files. BMV can be used to download HLS videos in both Progressive Downloading (in case of a live streaming event) and Regular Downloading (in case of a pre-recorded event stored in HLS format). In one embodiment, the steps are very similar to the steps for regular videos (see also FIG. 11). The main difference is that, we first acquire the index (.m3u8) file, and then regularly refresh the index file from the server, to learn the latest segments added to the HLS video. In particular, in this embodiment:

- A Video Player (i) tells BMV which networks to use to download by calling a function such as setNetworks (networks), (ii) tells BMV to start downloading by calling a function that we name progressive Download (videoUrl), and (iii) points the player data source to the HTTP Proxy Server by calling a function that we name setDataSource( ).
- Initially, the videoURL is the URL to the index (.m3u8) file. The index file contains pointers to the URLs for the segments. In live streaming, the index file gets updated as more video segments are added online; accordingly, BMV periodically downloads the latest version of the index file. BMV uses consistently the WiFi interface to download and refresh the index file (unless the device is operating in the cellular only mode).
- The URL used to download the index file can often be re-used to download segments, as they are typically stored on the same server as the index file. BMV takes advantage of this to produce segment URLs by replacing the resource part of the resolved URL, i.e., by replacing the index file name with the appropriate segment file name, and then checking if the resulting URL is valid. BMV employs the URI resolver to identify the remaining needed URLs.
- Each segment is treated in the same way as one video was before. In particular, the segment is divided into blocks that are added to the Buffer Map, the Block Pool and the Urgent Pool. Threads download the segment blocks through different interfaces. Once a segment is fully downloaded in the Cache, it is ready to be fetched into the HTTP Proxy Server, and then to the Video Player whenever requested.
- Segments are downloaded one at a time, starting from the one closer (in a forward direction) to the current playback time. When refreshing the index file, as BMV becomes aware of new segments, it sequentially schedules their download.

Figure 12:
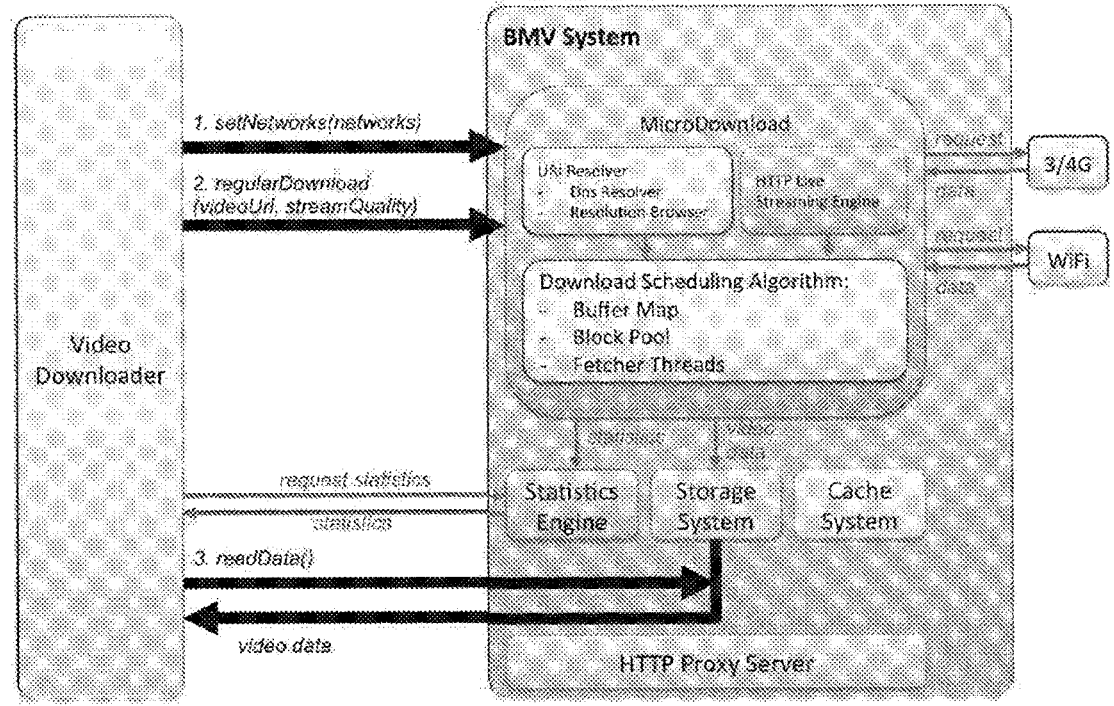
FIG. 12 shows an embodiment of the BMV Architecture and its possible interactions with a Video Downloader for Regular HLS Downloading, Solo Mode, where an HLS file is downloaded in the Storage System.
Figure 17:
FIG. 17 shows screenshots of the VideoBee application.

BMV also supports Adaptive (Quality) Streaming. In this case, we have multiple streams of HLS video, each corresponding to a different-quality video. Each stream has its own segments. Depending on how fast the HTTP Proxy Server serves the video data, the video player may adapt its chosen quality, i.e., choose a higher or lower-quality stream of the video to serve. BMV supports adaptive streaming by having, in one embodiment, the HTTP Proxy Server inform the HLS Engine of the current chosen stream of the video player. The notification can happen implicitly; for instance, the video player requests a specific quality segments from the HTTP Proxy; the Proxy learns this and in turn informs the HLS Engine to acquire segments of the requested quality. In an embodiment, the HLS engine will start downloading segments of the requested quality from the corresponding stream. For Regular Downloading, BMV can use the HLS Engine to acquire HLS videos, in one embodiment using a similar procedure as before. The differences include: first, the HLS Engine does not have to periodically fetch the index file (.m3u8), as this file is now static and only needs to be fetched once; second, the quality of the stream must be specified by the video downloader when it starts the download, i.e. by calling regular Download (videoUrl, stream Quality), as shown in FIG. 12.

VideoBee: BMV progressive and regular downloading has been implemented and tested into an android app, called VideoBee [11]. A screenshot from VideoBee is presented in FIG. 13. VideoBee has been very well received by both academia and industry [15-20]. When only a single phone is available, VideoBee can download a video using only cellular, only WiFi, or both cellular and WiFi (Solo Mode). If there is a second phone nearby, VideoBee connects the two devices through Bluetooth (Group Mode), and uses the Internet connection (cellular, WiFi, or dual) of the second phone to boost the download rate of the first phone (for the purposes of beta testing, we have currently limited the group size to 2.) In both cases, the primary device enjoys download speed up to the sum of all connections. FIG. 9 shows the tested performance of VideoBee in our lab. VideoBee enabled a single device to download at the sum speed of its WiFi and cellular connection, and to a group of two devices to download at the sum speed of their two cellular connections.

Beta testers' feedback: VideoBee has got a very successful Closed Beta testing period, when users could only run VideoBee when given an access code by us. It attracted about 3,000 users, and these are early adopters of our technology and were very eager to give us positive feedback.

Figure 10:
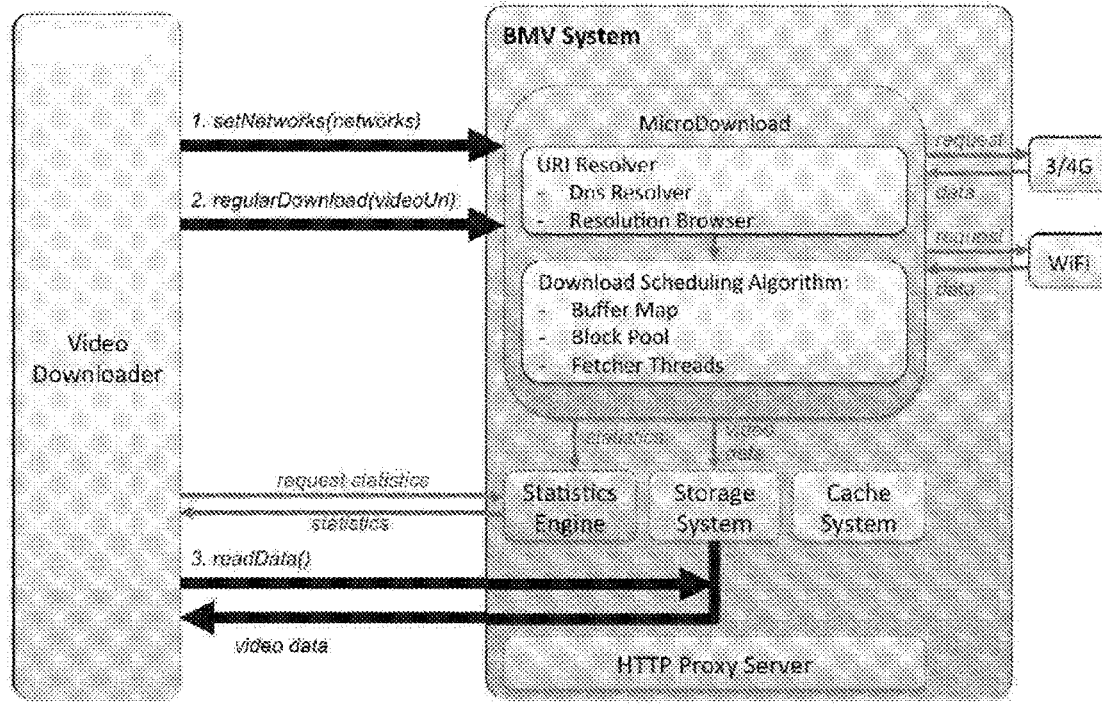
FIG. 10 shows an embodiment of the BMV Architecture and possible interactions when used for Regular Video Downloading in Solo Mode. In regular downloading the downloaded video blocks are stored in the Storage System and made available to the requesting software (video downloader).
Figure 11:
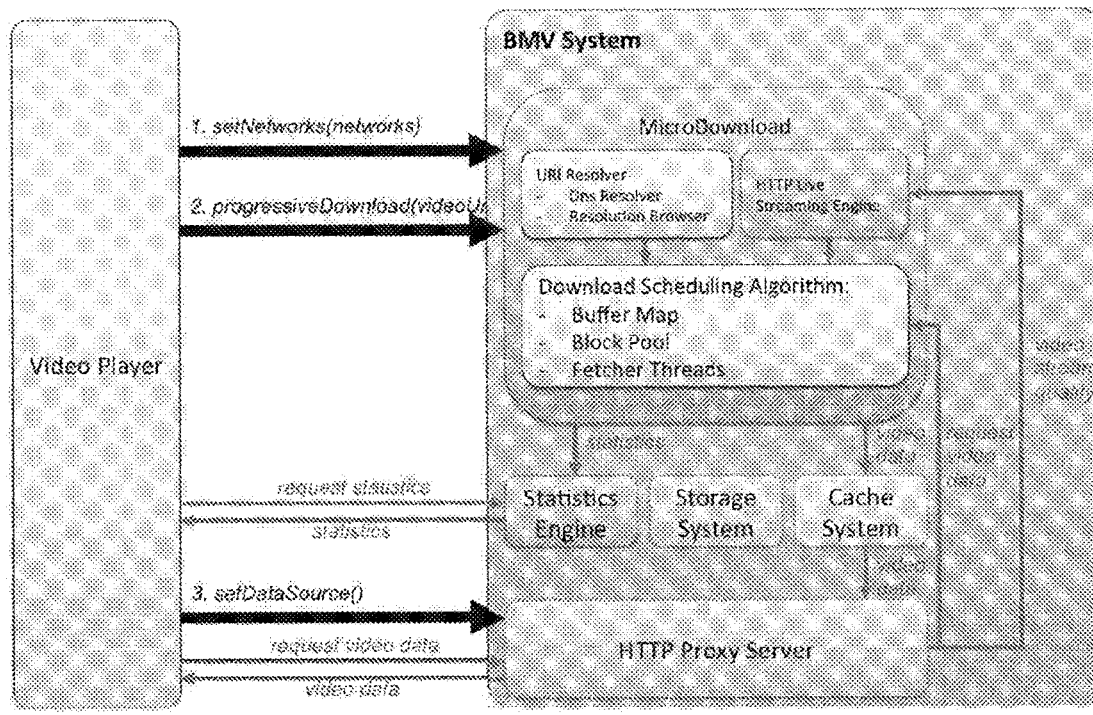
FIG. 11 shows an embodiment of the BMV Architecture and its potential interactions with a VideoPlayer when live streaming, in Progressive HLS Downloading, Solo Mode. In live streaming (HLS file) the HTTP Live Streaming Engine inside the Download Module component is activated.

Real world performance: At the end of December 2013, we finished the Closed Beta period and started the Open Beta where anybody can try out VideoBee by downloading it from the Google Play store [11]. So far, we have reached 15,000 unique users of the app, averaging 3,000 new users per week. We have also developed a monitoring module and integrated it with the industry-leading Flurry analytics engine [21] to collect the performance of VideoBee when used by thousands of users in the wild. FIGS. 10-12 show how much faster a user can download when using Solo Mode (with both WiFi and cellular) and Group Mode, respectively. In particular, from our collected statistics, Solo Mode could boost the download speed up to 2.6 times with the median boost rate of 1.5 times and the median boost speed of 0.5 Mbps (not shown in the graph). And Group Mode can boost the download speed up to 6.1 times with the median boost rate of 1.4 times and the median boost speed of 0.5 Mbps (not shown in the graph). These real-world statistics validate the performance gained by using our technology. The exact magnitude depends on the bandwidth of the available connections, but the boosting effect of VideoBee is practically additive.

Uploading The techniques used for uploading in one embodiment are the mirror image of the techniques used for downloading. Without repeating similar steps of the methods, the main differences include:

Servers: In one embodiment, we can upload to a BMV server (we can maintain several of them) or to third party servers (eg. Facebook servers). The servers run BMV software that simply collects the uploaded blocks and combines them in a single file in order of the range. In one embodiment, to do so, once blocks are uploaded, the servers communicate with each other to collect all the uploaded blocks in a single file on a designated main server. Once the file is combined, if we are using BMV servers, in one embodiment the main BMV server then forwards the video to the location that the user has asked for it to be uploaded (eg. Youtube or personal computer). As another embodiment, the servers exchange all the blocks they miss and thus they all reconstruct the uploaded video.

Solo Mode: In one embodiment, in the solo mode, BMV establishes multiple interfaces and threads, where now each interface is connected to the URL of one of the BMV servers (provided directly inside the application with no search), or to a third party server (which could again be providing by the collaborating third party or acquired with the same techniques as before. In uploading, we support the Regular Uploading mode. In one embodiment, BMV divides the video into blocks; threads pick up the blocks and upload them to the server one at a time; the buffer map keeps track of which blocks have been uploaded and which blocks are missing.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

REFERENCES

[1] Cisco, "Cisco Virtual Networking Index: Global Mobile Data Traffic Forecast Update, 2012-2017," http://www.cisco.com/en/US/solutions/collateral/ns341/ns525/ns537/ns705/ns827/white_paper_c11-520862.html (Accessed on Jan. 30, 2014).

[2] CNet News, "Can Apple's App Store maintain its lead over Google Play?," http://news.cnet.com/8301-1035_3-57521252-94/can-apples-app-store-maintain-its-lead-over-google-play (Accessed on Jan. 30, 2014).

[3] AT&T News Release, "AT&T to Invest $14 Billion to Significantly Expand Wireless and Wireline Broadband Networks, Support Future IP Data Growth and New Services", http://www.att.com/gen/press-room?pid=23506&cdvn=news&newsarticleid=35661 (Accessed on Jan. 30, 2014).

[4] Netflix, "Internet Connection Speed Recommendations," https://support.netflix.com/en/node/306 (Accessed on Jan. 30, 2014).

[5] YouTube, "Advanced encoding settings," https://support.google.com/youtube/answer/1722171?hI=en (Accessed on Jan. 30, 2014).

[6] Akamai, "The state of the internet," volume 4, No. 4, 4th quarter 2012 report.

[7] L. Keller, A. Le, B. Cici, H. Seferoglu, C. Fragouli, A. Markopoulou, "Microcast: Cooperative Video Streaming on Smartphones," in ACM MobiSys 2012, Lake Wood, UK, June 2012.

First place in AMASE (mobile apps) competition, UCI, June 2012.

Top 5 papers in ACM Mobisys 2012, June 2012.

Microcast research project: http://microcast.calit2.uci.edu

[8] National Science Foundation I-Corps Award 1258866, "MicroCast: Cooperative Networking of Mobile Devices," September 2012.

[9] AMASE Competition ("A Mobile Application Showcase Event"), School of ICS, UC Irvine, June 2012, http://www.ics.uci.edu/community/events/amase/index.php (Accessed on Jan. 30, 2014).

[10] National Science Foundation SBIR Phase I Award 1315106, "Microcast: Cooperative Video Delivery to Mobile Devices," June 2013.

[11] Android App VideoBeehttps://play.google.com/store/apps/details?id=com .shoelacewireless. app.videobee (Accessed on Jan. 30, 2014).

[12] Business Insider, "Here's What People Are Actually Watching On Their Smartphones And Tablets, As TV Goes Mobile," http://www.businessinsider.com/mobile-video-report-2013-12 (Accessed on Jan. 30, 2014)

[13] Conviva, "Viewer Experience Report, 2012" February 2013.

[14] Engadget, "YouTube Android app update brings HD video streaming to capable 2.2+ devices," http://www.engadget.com/2012/03/02/youtube-android-app-update-brings-hd-video-streaming-to-capable/(Accessed on Jan. 30, 2014).

[15] CTIA, "CTIA Announces Startup Throw Down Winners at CTIA 2013," http://www.ctia.org/resource-library/press-releases/archive/ctia-startup-throw-down-winners-ctia-2013 (Accessed on Jan. 30, 2014).

[16] VideoBee—Second Best Mobile App Award, ACM Mobicom Mobile App Competition, 2013 http://www.sigmobile.org/mobicom/2013/app_winners.html (Accessed on Jan. 30, 2014).

[17] XDA Developers, "Get Your Videos Faster with VideoBee for Android," http://www.xda-developers.com/android/get-your-videos-faster-with-videobee-for-android/ (Accessed on Jan. 30, 2014).

[18] Mobile Time, "VideoBee: app cria streaming "cooperativo" entre celulares," http://www.mobiletime.com.br/19/12/2013/videobee-app-cria-streaming-cooperativo-entre-celulares/364820/news.aspx (Accessed on Jan. 30, 2014).

[19] Android Ayuda, "Descarga y comparte videos rapidamente gracias a VideoBee para Android," http://android-ayuda.com/2013/11/09/descarga-y-comparte-videos-rapidamente-gracias-videobee-para-android/(Accessed on Jan. 30, 2014).

[20] Android Pipe, "Video Streaming at Its Best with VideoBee for Android," http://www.androidpipe.com/video-streaming-at-its-best-with-videobee-for-android/(Accessed on Jan. 30, 2014).

[21] Flurry Analytics http://www.flurry.com/flurry-analytics.html (Accessed on Jan. 30, 2014).

[22] IETF Internet Draft, "HTTP Live Streaming," http://tools.ietf.org/html/draft-pantos-http-live-streaming-12 (Accessed on Jan. 30, 2014).

[23] Apple iOS, "Using HTTP Live Streaming," https://developer.apple.com/library/mac/documentation/networkinginternet/onceptual/streamingmediaguide/UsingHTTP LiveStreaming/UsingHTTPLiveStreaming.html (Accessed on Jan. 30, 2014).

[24] Google Android, "Supported Media Format," http://developer.android.com/guide/appendix/media-formats.html (Accessed on Jan. 30, 2014).

[25] Marketing Charts, "Top 10 Mobile-Phone Websites, by US Market Share of Visits, August 2013," http://www.marketingcharts.com/wp/interactive/top-10-mobile-phone-websites-august-2013-36523/(Accessed on Jan. 30, 2014).

[26] Anh Le and Andrew Swerdlow, "Browser Extension Control Flow Graph Construction For Determining Sensitive Paths," U.S. Pat. No. 8,286,250, granted on Oct. 9, 2012.

[27] Anh Le and Andrew Swerdlow, "Browser Extension Control Flow Graph Based Taint Tracking," U.S. Pat. No. 8,365,291, granted on Jan. 29, 2013.

[28] BGR, "AT&T's 4G LTE network found to be the fastest in the U.S," http://bgr.com/2013/06/17/4g-lte-speeds-att-verizon-sprint-t-mobile (Accessed on Jan. 30, 2014).

[29] Arstechnica, "Multipath TCP lets Siri seamlessly switch between Wi-Fi and 3G/LTE," http://goo.gl/iWcTdT (Accessed on Jan. 30, 2014).

[30] Google, Vpn-Service documentation. http://developer.android.com/reference/android/netNpnService.html (Accessed on Jan. 30, 2014).

[31] Google Android, "Android 2.2 Platform Highlights," May 2010 http://developer.android.com/about/versions/android-2.2-highlights.html

[32] Samsung, "What is S Beam, and how do I use it?", http://www.samsung.com/us/support/supportOwnersHowToGuidePopup.do?how to_guide_seq=7042&prd_ia_cd=N0000003&map_seq=48157

[33] J. Kim, R. Khalili, A. Feldmann, Y-C. Chen, D. Towsley, "Multi-Source Multi-Path HTTP (mHTTP): A Proposal," arXiv.1310.2748 http://arxiv-web3.1ibrary.cornell.edu/abs/1310.2748v3 (Accessed on Jan. 30, 2014).

[34] MultiPath TCP http://www.multipath-tcp.org/(Accessed on Jan. 30, 2014).

[35] C. Tsao and R. Sivakumar, "On effectively exploiting multiple wireless interfaces in mobile hosts," In Proceedings of the 5$^{th}$International Conference on Emerging Networking Experiments and Technologies (CoNEXT), pages 337-348, 2009.

[36] H. Soroush, P. Gilbert, N. Banerjee, M. D. Corner, B. N. Levine, and L. Cox, "Spider: Improving mobile networking with concurrent wi-fi connections," in SIGCOMM Computer Communication Review, 41(4):402-403, August 2011.

[37] P. Rodriguez, R. Chakravorty, J. Chesterfield, I. Pratt, and S. Banerjee, "MAR: a commuter router infrastructure for the mobile internet," in Proceedings of the 2nd International Conference on Mobile Systems, Applications, and Services (MobiSys), pages 217-230, 2004.

[38] J. Chesterfield, R. Chakravorty, I. Pratt, S. Banerjee, and P. Rodriguez, "Exploiting diversity to enhance multimedia streaming over cellular links," in Proceedings of the 2005 IEEE INFOCOM, pages 2020-2031, March 2005.

[39] B. Han, P. Hui, V. A. Kumar, M. V. Marathe, G. Pei, and A. Srinivasan, "Cellular traffic offloading through opportunistic communications: a case study," in Proceedings of the 5th ACM Workshop on Challenged Networks (CHANTS), pages 31-38, 2010.

[40] S. Ioannidis, A. Chaintreau, and L. Massoulie. "Optimal and scalable distribution of content updates over a mobile social network," in Proceedings of the 2009 IEEE INFOCOM, pages 1422-1430, April 2009.

[41] J. Whitbeck, M. Amorim, Y. Lopez, J. Leguay, and V. Conan. "Relieving the wireless infrastructure: When opportunistic networks meet guaranteed delays," in Proceedings of the 2011 IEEE International Symposium on a World of Wireless, Mobileand Multimedia Networks (WoWMoM), pages 1-10, June 2011.

[42] C. Boldrini, M. Conti, and A. Passarella, "Exploiting users' social relations to forward data in opportunistic networks: The HiBOp solution," in Pervasive and Mobile Computing, 4(5):633-657, October 2008.

[43] P. Hui, J. Crowcroft, and E. Yoneki. "Bubble rap: social-based forwarding in delay tolerant networks," in Proceedings of the 9th ACM International Symposium on Mobile Ad Hoc Networking and Computing (Mobi-Hoc), pages 241-250, 2008.

[44] G. Ananthanarayanan, V. N. Padmanabhan, L. Ravindranath, and C. A. Thekkath, "COMBINE: leveraging the power of wireless peers through collaborative downloading," in Proceedings of the 5th International Conference on Mobile Systems, Applications and Services (MobiSys), pages 286-298, 2007.

[45] M. Stiemerling and S. Kiesel, "A system for peer-to-peer video streaming in resource constrained mobile environments," in Proceedings of the 1st ACM Workshop on User-provided Networking: Challenges and Opportunities (U-NET), pages 25-30, 2009.

[46] Verizon Share-Everything Plan, http://www.verizonwireless.com/wcms/consumer/shop/share-everything.html (Accessed on Jan. 30, 2014).

[47] AT&T Mobile Share Value Plans, http://www.att.com/shop/wireless/data-plans.html#fbid=1OndEspv7BW (Accessed on Jan. 30, 2014).

[48] T-Mobile, "Smartphone Mobile Hotspot," http://offers.t-mobile.com/tethering/admin/faq.jsp (Accessed on Jan. 30, 2014).

[49] L. Keller, A. Le, B. Cici, H. Seferoglu, C. Fragouli, A. Markopoulou, "System and Method for Cooperative Data Streaming," non-provisional patent applications, filed jointly by UC Irvine and EPFL, March 2013 (U.S. patent application Ser. No. 13/841,500).

[50] A. Le, L. Keller, C. Fragouli, A. Markopoulou, "System and Method for Local Multiplayer Gaming," non-provisional patent, filed jointly by UC Irvine and EPFL, March 2013. (U.S. patent application Ser. No. 13/841,956).

The invention claimed is:

1. A system for routing multi-channel-network traffic, the system comprising:

a. at least one network device having an operating system, which device is capable of communicating with a remote server over a plurality of data channels and is configured to operate a virtual private network (VPN)

service application, wherein the VPN service application performs operations comprising:
  i. establishing a virtual network interface and routing a set of outgoing data packets to a virtual network interface, wherein the data packets optionally are an open systems interconnection (OSI) layer-3 Internet protocol (IP) datagram or OSI layer-2 Ethernet frame;
  ii. reading the set of outgoing data packets to form a set of modified outgoing data packets;
  iii. assigning each data packet from the set of modified outgoing data packets to at least one of the plurality of data channels to form a subset of modified outgoing data packets;
  iv. sending the subsets of modified outgoing data packets to the remote server, optionally using one or more network sockets, which network socket(s) is(are) optionally selected from the group consisting of at least one of a layer-4 user datagram protocol (UDP) socket, a layer-4 transmission control protocol (TCP) socket, a layer-4 stream control transmission protocol (SCTP) socket, a socket configured to bind to a real physical network interface, and a layer-3 raw socket;
  v. receiving one or more subsets of modified incoming data packet(s) packets from at least one remote server, optionally using one or more network sockets, which network socket(s) is(are) optionally selected from the group consisting of at least one of a layer-4 user datagram protocol (UDP) socket, a layer-4 transmission control protocol (TCP) socket, a layer-4 stream control transmission protocol (SCTP) socket, a socket configured to bind to a real physical network interface, and a layer-3 raw socket; and
  vi. optionally reordering, assembling, and writing, the subsets of modified incoming data packets into a set of incoming data packets to the virtual network interface and optionally routing them to at least one network device application or operating system; and
b. at least one remote server that comprises a VPN service or a proxy service capable of communicating with at least one network device over the plurality of data channels and at least one of a plurality of target computer hosts, wherein at least one remote server is configured to perform operations comprising:
  i. receiving subsets of modified outgoing data packets from at least one network device via the plurality of data channels, wherein the subsets of modified outgoing data packets are optionally reordered and assembled into a set of outgoing remote server data packets, wherein the outgoing remote server data packets optionally are an open systems interconnection (OSI) layer-3 Internet protocol (IP) datagram or OSI layer-2 Ethernet frame;
  ii. forwarding the set of outgoing remote server data packets to one or more target computer hosts;
  iii. receiving a set of incoming computer host data packets from one or more target computer hosts to form a set of modified incoming computer host data packets;
  iv. assigning each data packet from the set of modified incoming computer host data packets to at least one of the plurality of data channels; and
  v. sending the subsets of modified incoming computer host data packets to at least one network device via the at least one of the plurality of data channels to which the subsets of modified incoming computer host data packets are assigned.

2. The system of claim 1, wherein at least one network device and at least one remote server provides a boosting policy that utilizes configurable and adaptive control logic that optionally performs one or more of the following operations: network/channel selection, network/channel prioritization, network/channel optimization, network/channel security, and network/channel bandwidth aggregation function(s) based on at least one or more of the following parameters: network/channel conditions, network/channel types, business rules, user behaviors and preferences, and application data traffic.

3. The system of claim 1 that further comprises one or more of the following:
  a. the virtual network interface is either a network TUNnel (TUN) or a network TAP (TAP) interface; and/or
  b. the VPN service and VPN service application is operated as an operating system module, wherein the virtual network interface is optionally a network TUNnel (TUN) or a network TAP (TAP) interface; and/or
  c. the VPN service and VPN service application is operated as an operating system service, wherein the virtual network interface is optionally a network TUNnel (TUN) or a network TAP (TAP) interface.

4. The system of claim 1 that further comprises one or more of the following:
  a. the remote server is configured with IP forwarding enabled, where the remote server optionally establishes a virtual network interface with network address translation, wherein upon receiving one or more incoming computer host data packets from a target computer host, the remote server optionally forwards the incoming host data packets to a network device of the system, optionally using the plurality of data channels simultaneously; and/or
  b. the remote server is configured with IP forwarding enabled, where the remote server optionally establishes a virtual network interface with network address translation, wherein upon receiving one or more outgoing remote server data packets and optionally forwards the outgoing remote server data packets to at least one target computer host; and/or
  c. encryption of each data packet from the set of modified outgoing data packets from at least one network device of the system and decryption by the remoter server of each data packet from the set of modified outgoing data packets, wherein packet encryption and decryption optionally is controlled by a security policy; and/or
  c. encryption of each data packet from the one or more subsets of modified incoming data packets from the at least one remote server and decryption by the network device, wherein packet encryption and decryption optionally is controlled by a security policy; and/or
  d. encoding of each data packet from the set of outgoing data packets from a network device of the system before being sent over the plurality of data channels and decoding thereof by the remote server, wherein packet encoding and decoding optionally is controlled by a coding policy; and/or
  e. encoding of each data packet from the set of incoming data packets from the remote server before being sent over the plurality of data channels and decoding thereof by the network device, wherein packet encoding and decoding optionally is controlled by a coding policy.

5. The system of claim 1, wherein the one or more of network devices communicates with the proxy service on the remote server via a proxy server application on at least one of the network devices of the system optionally using at least one of the plurality of data channels, wherein the proxy server application receives the set of outgoing data packets from the one or more of the network device's applications and forwards the same to the remote server, wherein the proxy server application receives the set of incoming data packets from the remote server and forwards them to the one or more of the network device's applications, optionally via one or more of the plurality of data channels.

6. The system of claim 1, wherein at least one remote server provides wireless or wired connectivity and functions as a wireless access point, wherein the wireless access point optionally comprises Wi-Fi routers, mobile device, cellular macro cells, small cells, micro cells, pico cells, or femto cells.

7. The system of claim 1, wherein only one of the available data channels is actively used during communication of data between at least one network device and at least one remote server and at least another data channel of the plurality of data channels is kept active to immediately carry data traffic of the data channel in use should this data channel fails or becomes unavailable.

8. The system of claim 1, wherein the boosting policy uses connection control logic on the one or more of the network devices performs at least one of the following operations:
   a. selecting and connecting to wireless access points; and/or
   b. configuring the operation of a VPN service or a proxy service; and/or
   c. implementing source based or policy based routing; and/or
   d. functioning as a switch to resolve and find specific channels for transmitting data packets of all or selected application traffic to and from the remote server using one or more network channels.

9. The system of claim 1, wherein the VPN service application is a software development kit (SDK).

10. A system for routing multi-channel network traffic without using a remote server, the system comprising one or more network devices capable of communicating over a plurality of data channels and configured to operate a virtual private network (VPN) service application, optionally implemented as an operating system module or as an operating system service, wherein the VPN service application comprises a routing module, optionally consisting of a user datagram protocol (UDP) translator and a transmission control protocol (TCP) translator, and wherein the service application performs operations comprising:
   a. establishing a virtual network interface and routing a set of outgoing data packets to the virtual network interface, wherein the outgoing data packets optionally are an open system interconnection (OSI) layer-3 Internet protocol (IP) datagram or an OSI layer-2 Ethernet frame;
   b. reading the set of outgoing data packets from the virtual network interface and extracting data from the set of outgoing data packets;
   c. assigning each subset of outgoing data packets from the set of outgoing data packets to at least one of a UDP translator and a TCP translator to form a set of modified outgoing data packets;
   d. sending the one or more subsets of modified outgoing data pockets via at least one of the network sockets using at least one of the plurality of data channels to at least one of the target computer hosts, optionally using at least one of a layer-4 user datagram protocol with layer-3 Internet protocol (UDP/IP), a layer-4 transmission control protocol with layer-3 Internet protocol (TCP/IP) data traffic network sockets, and/or a socket configured to bind to a real physical network interface, and wherein the network sockets optionally are at least one of a protected and or a standard socket;
   e. receiving one or more subsets of modified incoming data packets from at least one target computer host via at least one of the network socket using at least one of the plurality of data channels;
   f. extracting data from the one or more subsets of modified incoming data packets to form one or more subsets of incoming data packets; and
   h. optionally reordering, assembling, and writing the subsets of incoming data packets to the virtual network interface and optionally routing them to at least one network device applications or operating system.

11. The system of claim 10 that further comprises one or more of the following:
   a. the virtual network interface is either a network TUNnel (TUN) or a network TAP (TAP) interface; and/or
   b. the VPN service application is operated as an operating system module, wherein the virtual network interface is optionally a network TUNnel (TUN) or a network TAP (TAP) interface; and/or
   c. the VPN service application is operated as an operating system service, wherein the virtual network interface is optionally a network TUNnel (TUN) or a network TAP (TAP) interface.

12. The system of claim 11, wherein the VPN service application is a software development kit (SDK).

13. The system of claim 10, wherein at least one network device provides a boosting policy that utilizes configurable and adaptive control logic that optionally performs one or more of the following operations optionally communicating with a remote management server: network/channel selection, network/channel prioritization, network/channel optimization, network/channel security, and network/channel bandwidth aggregation function(s) based on at least one or more of the following parameters: network/channel conditions, network/channel types, business rules, user behaviors and preferences, and application data traffic.

14. The system of claim 10, wherein the VPN service application further performs at least one of the following operations:
   a. reassembling or reordering data received over one or more data channels; and/or
   b. constructing data packets from data received over one or more data channels; and/or
   c. writing data packets to the virtual network interface; and/or
   d. routing data packets to network device applications or operation system; and/or
   e. encrypting outgoing data packets; and/or
   f. encoding of outgoing data packets; and/or
   g. decrypting incoming data packets; and/or
   i. decoding incoming data packets.

15. The system of claim 10, wherein the boosting policy use connection control logic on the one or more of the network devices performs at least one of the following operations:
   a. selecting and connecting to wireless access points; and/or
   b configuring the operation of a VPN service application or a proxy service application; and/or
   c. implementing source based or policy based routing; and/or d. functioning as a switch to resolve and find specific channels for transmitting data packets of all or selected application traffic to and from the remote server using one or more network channels.

16. A system for increasing performance when downloading and uploading data files on at least one network device configured to communicate with at least one target computer host, optionally over an application layer and optionally using at least one remote server or proxy server, the system comprising:

A. at least one network device capable of communicating over plurality of data channels using at least one method comprising:

i obtaining location information of at least one file to be downloaded, wherein the location information optionally is of at least one of a URL, a URI, or resource location information; and performing operations comprising:
   a) using the location information to obtain at least one network address of the data file(s) to be downloaded, which address optionally comprises at least one of a IPv4 and a IPv6 address, and wherein the network address is optionally obtained using an authoritative DNS server, a non-authoritative DNS server, or a local database;
   b) optionally assigning at least one of the network addresses to at least one of the plurality of data channels;
   c) optionally establishing a communication link with at least one of a remote server or a proxy server;
   d) obtaining data of at least one file to be downloaded optionally using at least one of a remote server or proxy server; wherein data comprise of at least one of a metadata, a header data, and a range data and then dividing at least one file into plurality of data blocks using the obtained data;
   e) assigning each of the plurality of data blocks intelligently to at least one of the plurality of data channels;
   f) requesting data block downloads via establishing at least one communication link to at least one of the network addresses using at least one or more of data channels optionally via a remote server or a proxy server;
   g) managing the state of each block and scheduling or retrying each download via a boosting policy;
   h) assembling blocks and writing at least one file to at least one of a permanent storage, a temporary storage, and a random access memory (RAM); and
   i) optionally executing the file while being downloaded or after download completion; or ii obtaining location information of at least one file to be uploaded wherein the location information is of at least one of a URL, a URI, and a resource location information, and perform operations comprising:
   a) using the location information to obtain at least one network address of the data file(s) to be uploaded, which address optionally comprises at least one of a IPv4 and a IPv6 address, and wherein the network address is optionally obtained using an authoritative DNS server, a non-authoritative DNS server, or a local database;
   b) optionally assigning at least one of the network addresses to at least one of the plurality of data channels;
   c) optionally establishing a communication link with at least one of a remote server or a proxy server;
   d) dividing the file into plurality of blocks;
   e) assigning each of the plurality of blocks intelligently to at least one of the plurality of data channels via a boosting policy;
   f) uploading blocks via establishing at least one communication link to at least one of the network addresses using at least one of a plurality of data channels optionally via a remote server or proxy server;
   g) managing the state of each block and scheduling or retrying each upload via a boosting policy;

B. optionally at least one remote server or proxy server capable of communicating with at least one of a network device and a target host over at least one or more data channels, and performing operations comprising:
   i accepting at least one communication link from at least one network device of the system;
   ii establishing at least one communication link to at least one target host using at least one network interface;
   iii accepting at least one or more download or upload requests from at least one network device of the system for at least one of the blocks and forwarding download or upload requests to at least one target hosts;
   iv accepting at least one response from at least one target host and forwarding at least one response to at least one network device over one or more of the data channels;
   v accepting and caching at least one or more of the blocks downloaded from at least one of the target hosts over one or more of the data channels;
   vi collecting the cached downloaded blocks and performing at least one of a reordering and an assembling of the cached data blocks into the original file and optionally forwarding at least one file to one or more network devices using at least one of a plurality of data channels;
   vii accepting and caching at least one or more of the blocks uploaded from at least one of the network devices of the system over one or more of the data channels; and
   viii collecting the cached uploaded blocks and performing at least one of a reordering and an assembling of the cached data blocks into the original file and optionally forwarding at least one file to one or more target computer hosts using at least one of a plurality of data channels; and C. optionally operating a boosting policy that utilizes configurable and adaptive control logic that optionally performs one or more of the following operations:

network/channel selection, network/channel prioritization, network/channel optimization, network/channel security, and network/channel bandwidth aggregation function(s) based on at least one or more of the following parameters:

network/channel conditions, network/channel types, business rules, user behaviors and preferences, and application data traffic.

17. The system of claim 16 that is implemented as a software development kit (SDK).

* * * * *